United States Patent
Zhao et al.

(10) Patent No.: US 10,408,678 B2
(45) Date of Patent: Sep. 10, 2019

(54) SENSOR DEVICE FOR PLANTS HAVING A SPECTROSCOPY VEGETATION INDEX AND HEIGHT OF THE TARGET PLANT DETERMINATION

(71) Applicant: TOPCON CORPORATION, Tokyo (JP)

(72) Inventors: Peng Zhao, Tokyo (JP); Shugo Akiyama, Tokyo (JP); Issei Hanya, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 100 days.

(21) Appl. No.: 15/569,493

(22) PCT Filed: Apr. 20, 2016

(86) PCT No.: PCT/JP2016/062461
§ 371 (c)(1),
(2) Date: Oct. 26, 2017

(87) PCT Pub. No.: WO2016/175094
PCT Pub. Date: Nov. 3, 2016

(65) Prior Publication Data
US 2018/0299327 A1     Oct. 18, 2018

(30) Foreign Application Priority Data
Apr. 30, 2015  (JP) .................................. 2015-092650

(51) Int. Cl.
*A01C 21/00* (2006.01)
*G01J 3/427* (2006.01)
(Continued)

(52) U.S. Cl.
CPC ............ *G01J 3/427* (2013.01); *A01C 21/002* (2013.01); *A01C 21/007* (2013.01); *A01G 22/00* (2018.02); *A01M 7/0089* (2013.01); *G01B 11/02* (2013.01)

(58) Field of Classification Search
CPC ......... A01C 21/007; G01B 11/02; G01J 3/427
(Continued)

(56) References Cited

U.S. PATENT DOCUMENTS 8,823,945 B2 * 9/2014 Haas ...................... G01N 21/31
356/445
2012/0298847 A1   11/2012 Hayashi et al.

FOREIGN PATENT DOCUMENTS

AU      2012203090       12/2012
CN      102088839         6/2011
(Continued)

OTHER PUBLICATIONS

International Search Report dated Jul. 19, 2016 in International (PCT) Application No. PCT/JP2016/062461.

*Primary Examiner* — Que Tan Le
(74) *Attorney, Agent, or Firm* — Wenderoth, Lind & Ponack, L.L.P.

(57) ABSTRACT

To provide a plant sensor device capable of obtaining a parameter to determine a growth status other than a spectroscopy vegetation index without increasing its configuration. The plant sensor device includes a light emission part for emitting a measurement light to irradiate a target plant, a light receiving part for receiving a reflected light from the target plant, and a control section for controlling the light emission part and light receiving part. The control section determines a spectroscopy vegetation index of the target plant by obtaining a reflection rate of the target plant based on the measurement light and reflected light. The control section calculates a distance from the target plant to the light
(Continued)

emission part in accordance with the measurement light and reflected light, and determines a plant height of the target plant based on the distance.

8 Claims, 14 Drawing Sheets

(51) Int. Cl.
    *G01B 11/02* (2006.01)
    *A01M 7/00* (2006.01)
    *A01G 22/00* (2018.01)

(58) Field of Classification Search
    USPC .............................................. 250/221, 559.4
    See application file for complete search history.

(56) References Cited

FOREIGN PATENT DOCUMENTS

| CN | 102798616 | 11/2012 |
| EP | 2 526 754 | 11/2012 |
| JP | 2008-79549 | 4/2008 |
| JP | 2010-220569 | 10/2010 |
| JP | 2012-247235 | 12/2012 |
| WO | 2010/110040 | 9/2010 |

\* cited by examiner

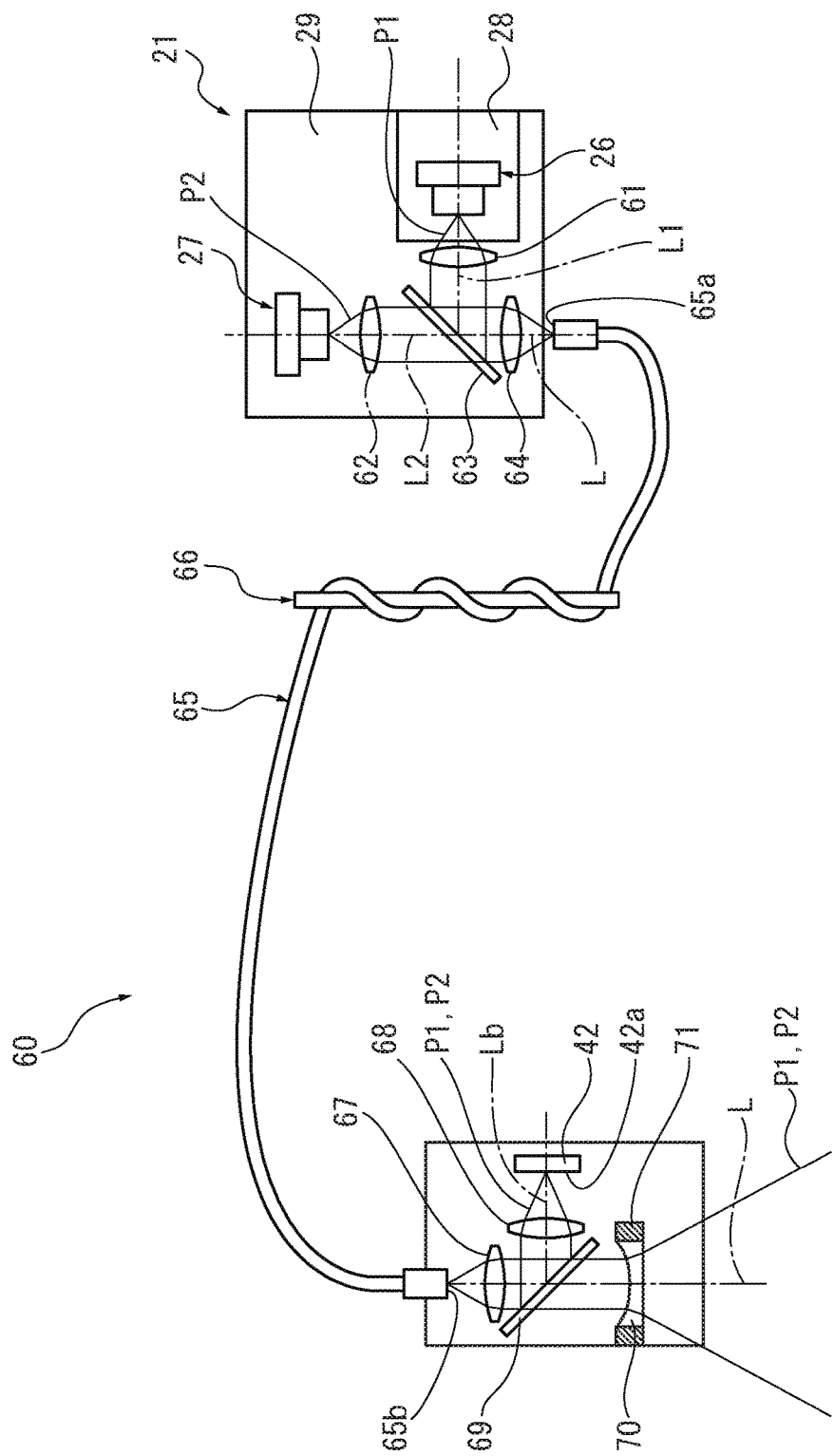

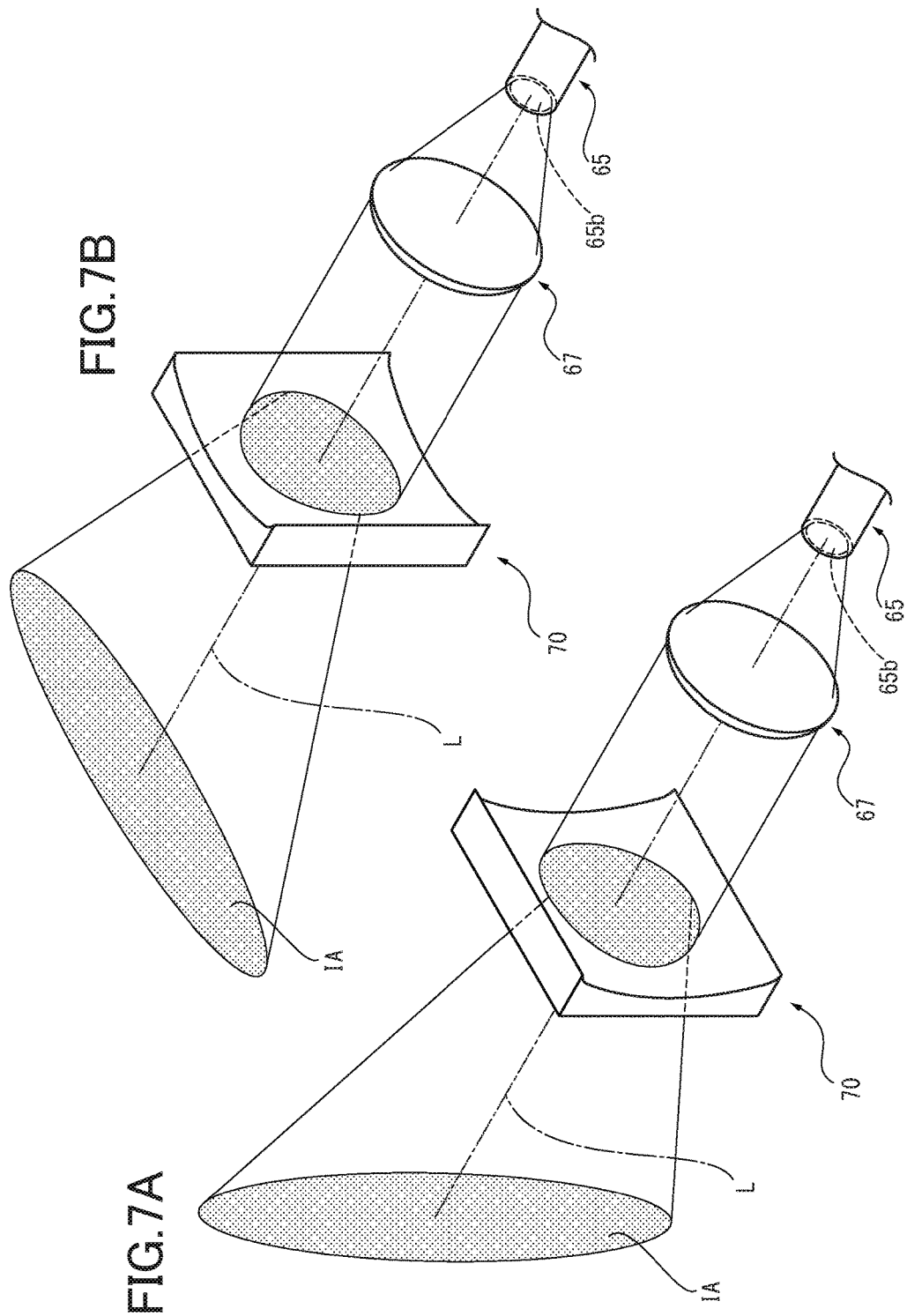

… (1)

SENSOR DEVICE FOR PLANTS HAVING A SPECTROSCOPY VEGETATION INDEX AND HEIGHT OF THE TARGET PLANT DETERMINATION

CROSS-REFERENCE TO RELATED APPLICATION

The present application is based on and claims priority to Japanese Patent Application No. 2015-092650, filed on Apr. 30, 2015, the disclosure of which is hereby incorporated by reference in its entirety.

TECHNICAL FIELD

This disclosure relates to a plant sensor device capable of determining a growth status of a plant or the like.

BACKGROUND ART

In order to improve the productivity of agricultural products, it is important to accurately determine the growth status of a crop so as to efficiently produce the crop. To this end, there is a known technique that irradiates a measurement light to a plant (e.g., crop (target plant)), receives the measurement light reflected on the crop, calculates a reflection rate at which the crop reflects the measurement light, and determines, based on the calculated reflection rate, a spectroscopy vegetation index such as a normalized difference vegetation index (NDVI) that is indicative of the growth status of the crop. Since the spectroscopy vegetation index is one of the parameters to determine the growth status of a plant, knowing the index makes a substantial contribution to the determination of the growth status of the crop.

In a conventional technique, a plant sensor device capable of appropriately receiving the light reflected on the crop to determine the spectroscopy vegetation index accurately and to appropriately determine the growth status of the crop has been taught (see JP 2012-247235 A, for example). The conventional plant sensor device can reduce the influence of a light volume component caused by a disturbance light and appropriately receive the reflected light from the crop. As a result, the conventional plant sensor device can accurately determine the spectroscopy vegetation index to appropriately determine the growth status of the crop.

SUMMARY

Technical Problem

As explained above, the spectroscopy vegetation index is only one of the parameters to determine a growth status of a plant and indicates only one of the aspects of the growth status. Therefore, it is preferable for a plant sensor device to measure a parameter different from the spectroscopy vegetation index to appropriately determine the growth status of the crop. However, adding a configuration for measuring a parameter to determine the growth status into a conventional plant sensor device increases the size and the complexity of the configurations, and the manufacturing cost.

In view of the above problem, an object of the disclosure is to provide a plant sensor device capable of measuring a parameter different from the spectroscopy vegetation index to determine a growth status without increasing the number of the components of the device.

Solution to Problem

In order to achieve the above object, an aspect of a plant sensor device of the disclosure comprises a light emission part for emitting a measurement light to irradiate a target plant, a light receiving part for receiving the measurement light reflected on the target plant as a reflected light, and a control section for controlling the light emission part and the light receiving part. The control section is configured to determine a spectroscopy vegetation index of the target plant by determining a reflection rate of the target plant in accordance with the measurement light and the reflected light. The control section is configured to calculate a distance from the light emission part to the target plant based on the measurement light and the reflected light, and to determine a plant height of the target plant in accordance with the distance.

BRIEF DESCRIPTION OF DRAWINGS

FIG. 6 is an explanatory view schematically illustrating a configuration of an irradiation optical system.

FIG. 7A is an explanatory view schematically illustrating that an irradiation area IA rotates around an optical axis L of the emitted light along with a rotation of a cylindrical lens 70.

FIG. 7B is an explanatory view schematically illustrating that an irradiation area IA rotates around the optical axis L of the emitted light along with the rotation of the cylindrical lens 70.

DESCRIPTION OF EMBODIMENTS

Hereinafter, an embodiment of a plant sensor device according to the present invention will be described with reference to the drawings.

Embodiment

First, a schematic configuration of a plant sensor device 10 according to the disclosure is described with reference to FIGS. 1 to 17.

Figure 8A:
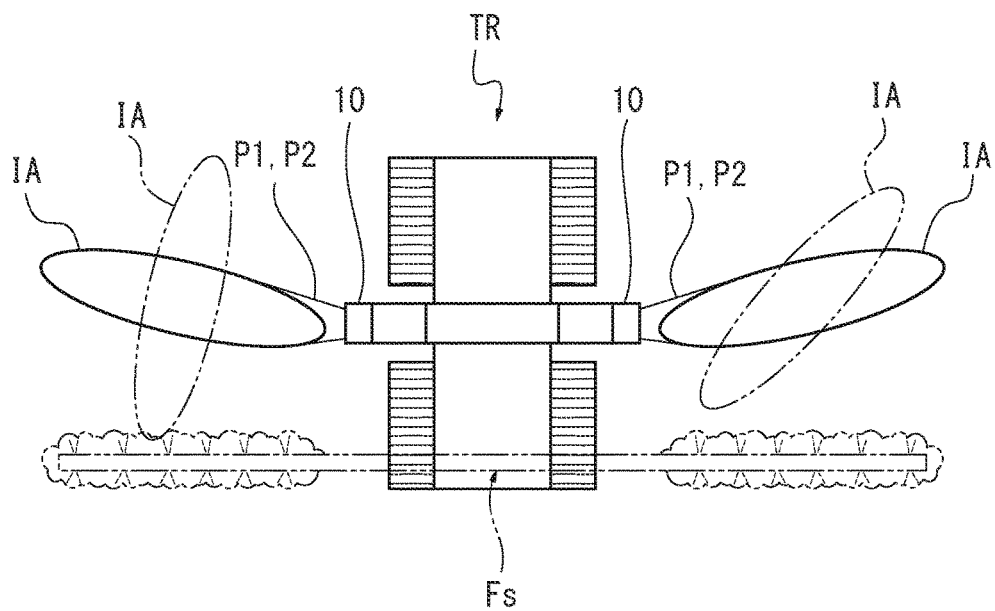
FIG. 8A is an explanatory view schematically illustrating that the irradiation areas IA formed by the two plant sensor devices 10 on the tractor TR rotate around the optical axes L of the emitted light.
Figure 8B:
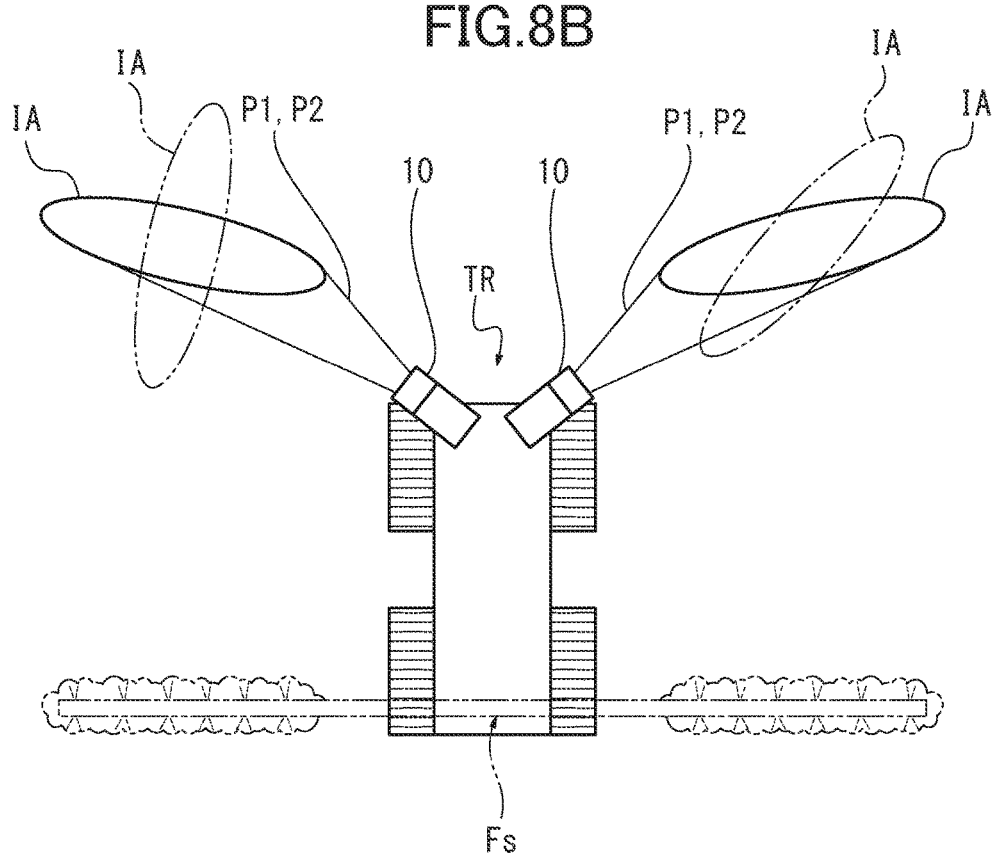
FIG. 8B is an explanatory view schematically illustrating that the irradiation areas IA formed by the two plant sensor devices 10 on the tractor TR rotate around the optical axes L of the emitted light.
Figure 10A:
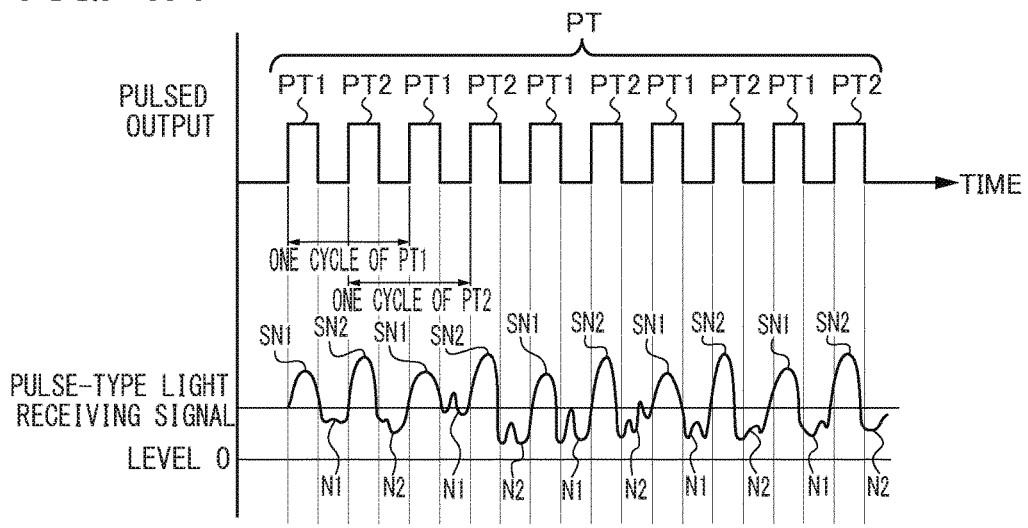
FIG. 10A is an explanatory view for explaining an example of integration process of light receiving signals outputted from a light receiving unit 22.
Figure 10B:
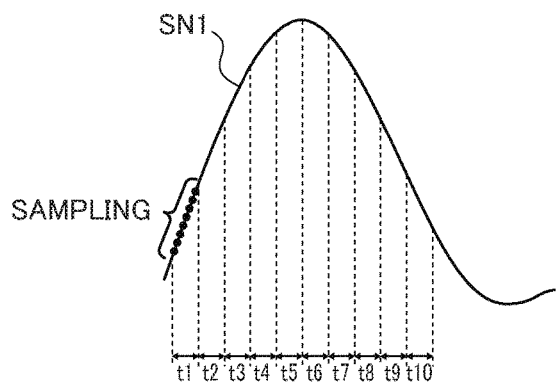
FIG. 10B is an explanatory view for explaining an example of integration process of light receiving signals outputted from the light receiving unit 22.
Figure 10C:
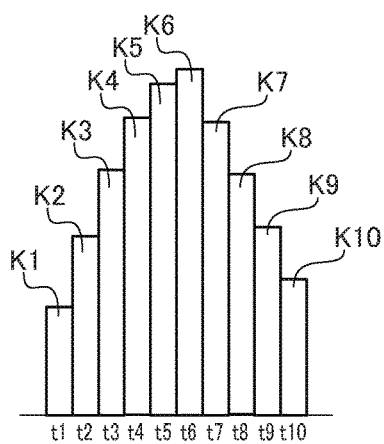
FIG. 10C is an explanatory view for explaining an example of integration process of receiving signals outputted from the light receiving unit 22.

FIG. 7A illustrates an irradiation area IA longitudinally extending in a front view, and FIG. 7B illustrates the irradiation area IA horizontally extending in the front view. FIG. 8A illustrates two plant sensor devices 10 arranged on both sides of a tractor TR, and FIG. 8B illustrates the two plant sensor devices 10 diagonally arranged on a front side of the tractor TR. FIG. 10A shows relationships between an output of periodic pulses PT and a light receiving output from a light receiving unit 22 (light receiving part 35 (first light receiving part)), FIG. 10B shows a sampling method for the light receiving output in which the light receiving output is divided into several time-segments and is sampled in each segment, and FIG. 10C shows that sampling values in each time-segment are summed up and the largest value (i.e., the value K6 in FIG. 10C) among the values of all the segments is determined as a light receiving output value.

Figure 15:
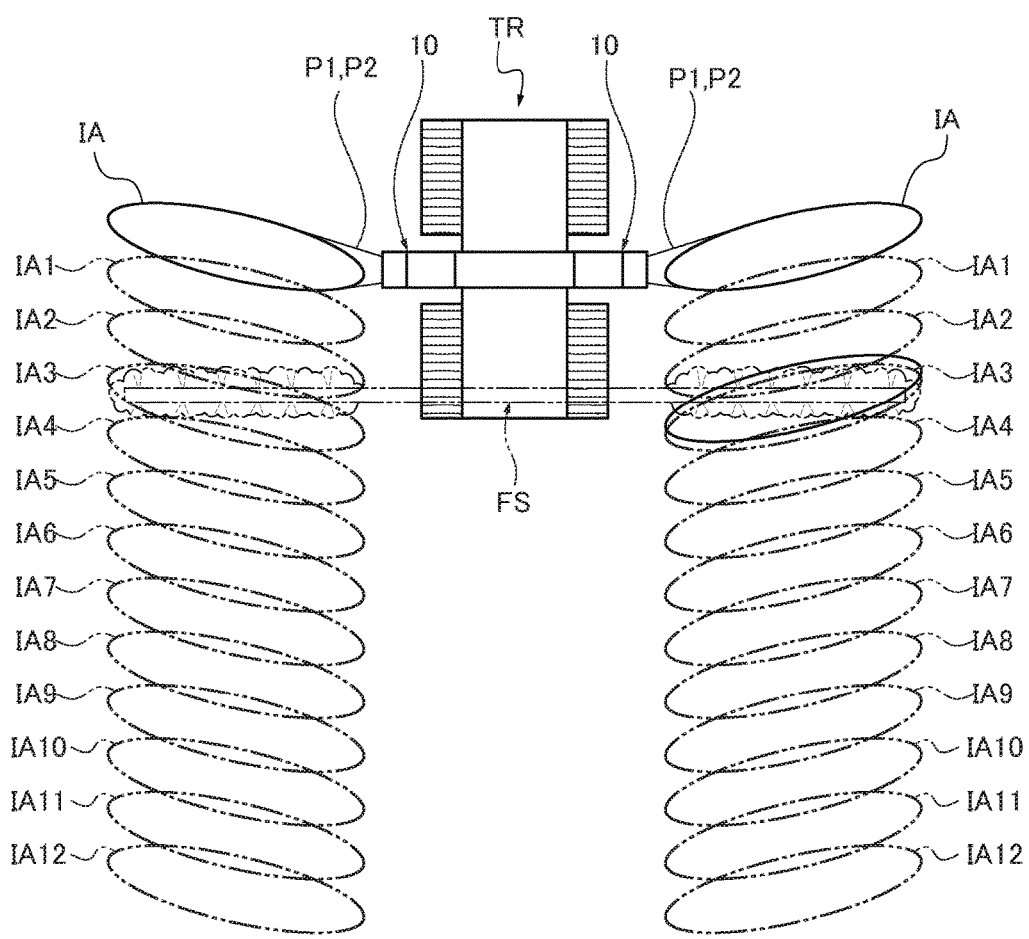
FIG. 15 is an explanatory view illustrating that normalized difference vegetation indexes (spectroscopy vegetation indexes) and the plant heights H are continuously determined.
Figure 17:
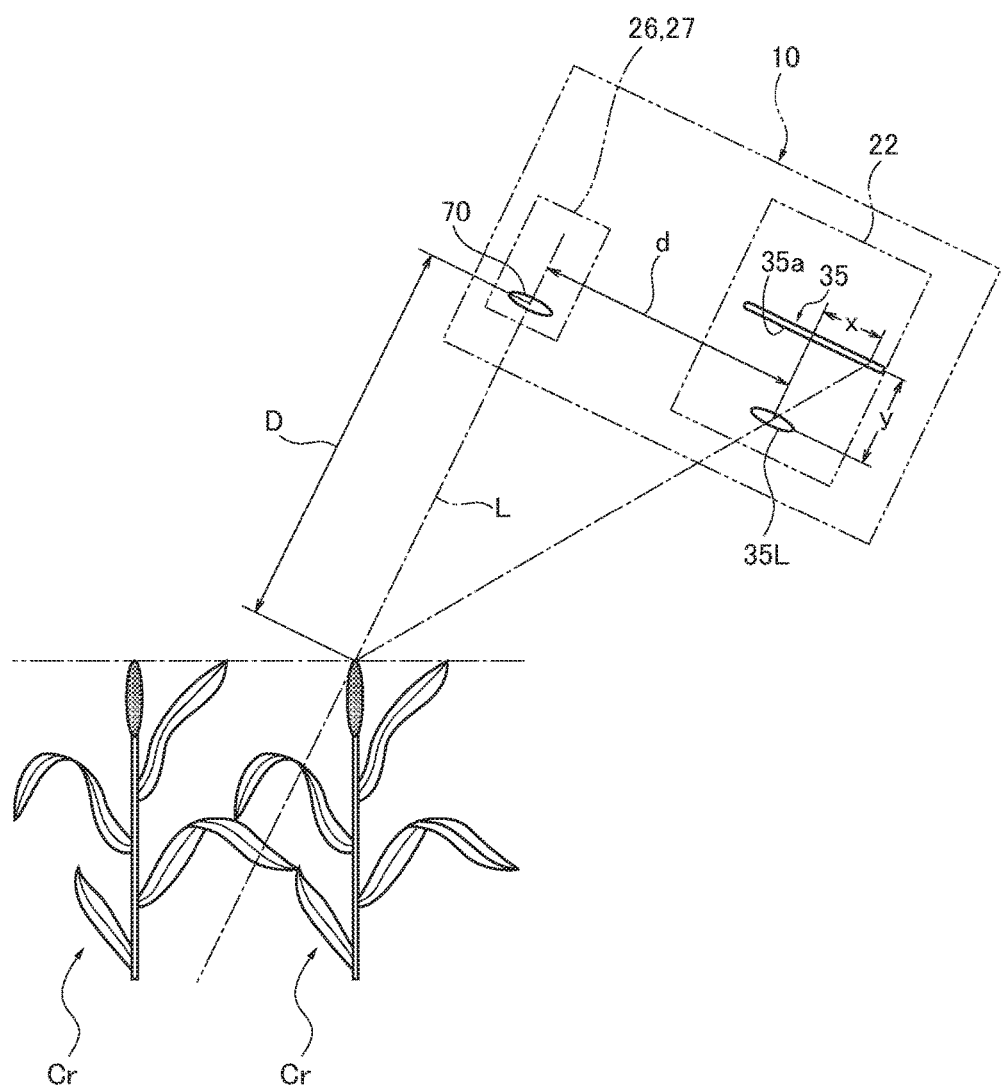
FIG. 17 is an explanatory view for explaining an example to measure a distance D using a triangular method.

Here, FIGS. 7A and 7B omit a half mirror 69 to facilitate understanding the rotation of the irradiation region IA with respect to the positional relationship of a fourth lens 67 and a cylindrical lens 70. FIG. 15 schematically illustrates the irradiation areas IA to facilitate understanding that the determination of normalized difference vegetation indexes (NDVIs) and plant heights H are continuously performed. Note that the embodiment illustrated in FIG. 15 does not have to identically correspond to the actual embodiment of the irradiation areas IA for determining the normalized difference vegetation indexes and plant heights H. FIG. 17 schematically illustrates an embodiment of the disclosure to facilitate understanding the concept of how a distance D is obtained using a triangular method. Here, the embodiment illustrated in FIG. 17 does not have to identically correspond to the actual embodiment thereof.

Figure 1:
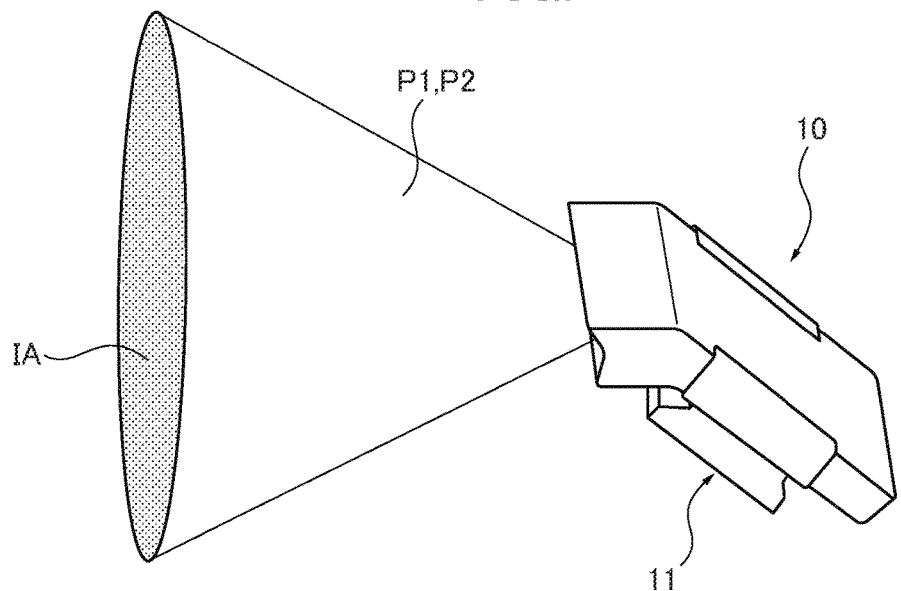
FIG. 1 is a perspective view schematically illustrating a plant sensor device 10 as an example of the plant sensor device according to the disclosure.

As illustrated in FIG. 1, the plant sensor device 10 of the embodiment according to the disclosure irradiates both a first measurement light P1 and a second measurement light P2 to the same irradiation area IA as examples of the measurement lights. Here, the wavelength of the first measurement light P1 is set to be different from that of the second measurement light P2. The wavelengths of the first measurement light P1 and the second measurement light P2 mean the wavelengths at which the spectral intensities of the corresponding measurement lights show their peak values. The plant sensor device 10 irradiates the first measurement light P1 and the second measurement light P2 to target plants Cr (i.e., plants the growth status of which is determined) and obtains reflected lights Pr of the first measurement light P1 and the second measurement light P2 from the target plant. The plant sensor device 10 then determines a spectroscopy vegetation index and/or a plant height H as a parameter to determine the growth status of the target plants Cr based on the measurement lights and the reflected lights Pr.

The plant sensor device 10 calculates a reflection rate of the target plants with respect to the first measurement light P1 and the second measurement light P2 so as to determine the spectroscopy vegetation index. The calculation of the reflection rates of the reflected lights Pr will be explained in detail later. Here, the plant sensor device 10 of the disclosure determines, as an example of the spectroscopy vegetation index, a normalized difference vegetation index (NVDI) that indicates the growth status of the target plants. To this end, the plant sensor device 10 uses a light in a red wavelength range as the first measurement light P1 and a light in an infrared wavelength range as the second measurement light P2 and calculates or obtains the reflection rate of the target plant with respect to the first measurement light P1 and the second measurement light P2. The plant sensor device 10 then determines the normalized difference vegetation index (NDVI) based on an equation of "NDVI=(IR−R)/(IR+R)", where R represents the reflection rate of the first measurement light P1 in the red wavelength range and IR represents the reflection rate of the second measurement light P2 in the infrared wavelength range. Additionally, the plant sensor device 10 may calculate a growth index by multiplying the normalized difference vegetation index (NDVI) by 100 times (i.e., GI=NDVI*100) to increase the displayed number of digits for the normalized difference vegetation index (NDVI).

The plant sensor device 10 is equipped with an operating section (not illustrated) to perform and realize each function of the device. For example, the functions of the plant sensor device 10 include the irradiation of the first measurement light P1 and the second measurement light P2, the adjustment of the rotating postures of the irradiation areas IA, and the calculation of the normalized difference vegetation index (NDVI) and the plant height H based on the first measurement light P1 and the second measurement light P2. Further, the plant sensor device 10 is provided with an attachment part 11. The attachment part 11 allows the plant sensor device 10 to be attached to any place.

Figure 2:
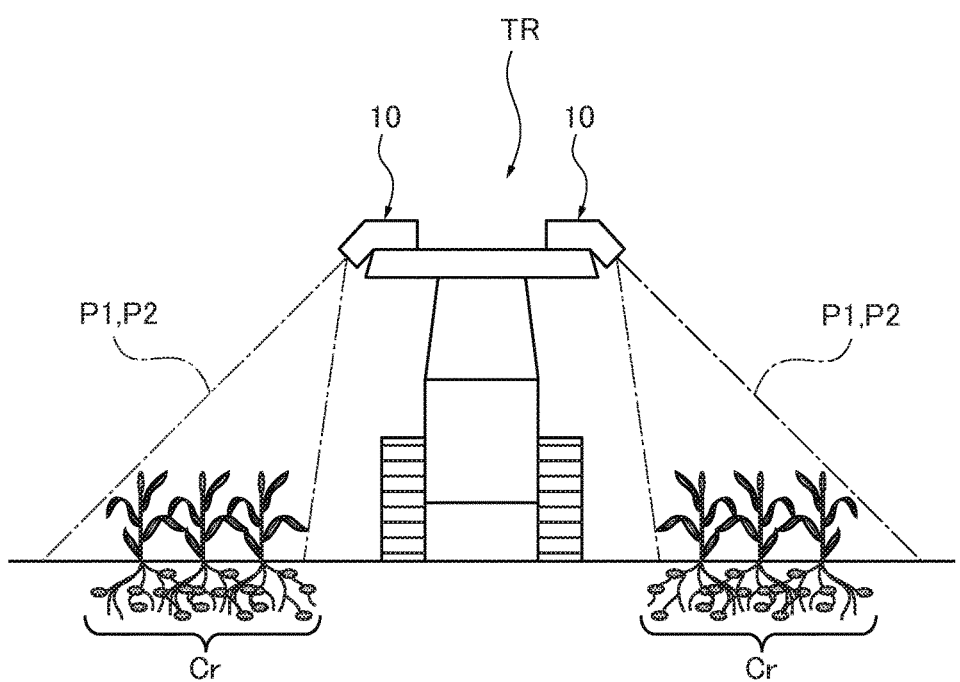
FIG. 2 is an explanatory view illustrating an arrangement in which two plant sensor devices 10 are provided to a tractor TR.

As illustrated in FIG. 2, the plant sensor devices 10 may be provided to an agricultural machine such as a tractor TR via the attachment part 11, for example. In this example of FIG. 2, two plant sensor devices 10 are respectively provided to both sides of the tractor TR and respectively form the irradiation areas IA on the sides of the tractor TR (see FIG. 1 and FIGS. 8A, 8B). When the tractor TR travels, the plant sensor devices 10 form the irradiation areas IA on the both sides of the tractor TR. That is, by driving the tractor TR along a side of the target plants such as crops Cr, the plant sensor devices 10 can obtain the parameters to determine the growth status (e.g., normalized difference vegetation index (NVDI) and plant height H) of the crops Cr. The illustrated tractor TR is further equipped with a fertilizer spreader Fs (illustrated in FIGS. 8A, 8B). The fertilizer spreader Fs adjusts the amount of a fertilizer and spreads the fertilizer under the control of a control section (not illustrated). The fertilizer spreader Fs is configured such that the control section thereof communicates and exchanges data with each of the plant sensor devices 10 (specifically, with its CPU 23) through a driver circuit 40 and a driver circuit 41 (see FIG. 3), and spreads the fertilizer in accordance with the parameters to determine the growth status (normalized difference vegetation index (NDVI) and plant height H) obtained by each of the plant sensor devices 10. Accordingly, the fertilizer spreader Fs can spreads the appropriate amount of the fertilizer in accordance with the growth status of the crop while driving the tractor TR along an agricultural land (field). With this, it becomes possible to cultivate the crop efficiently.

Figure 3:
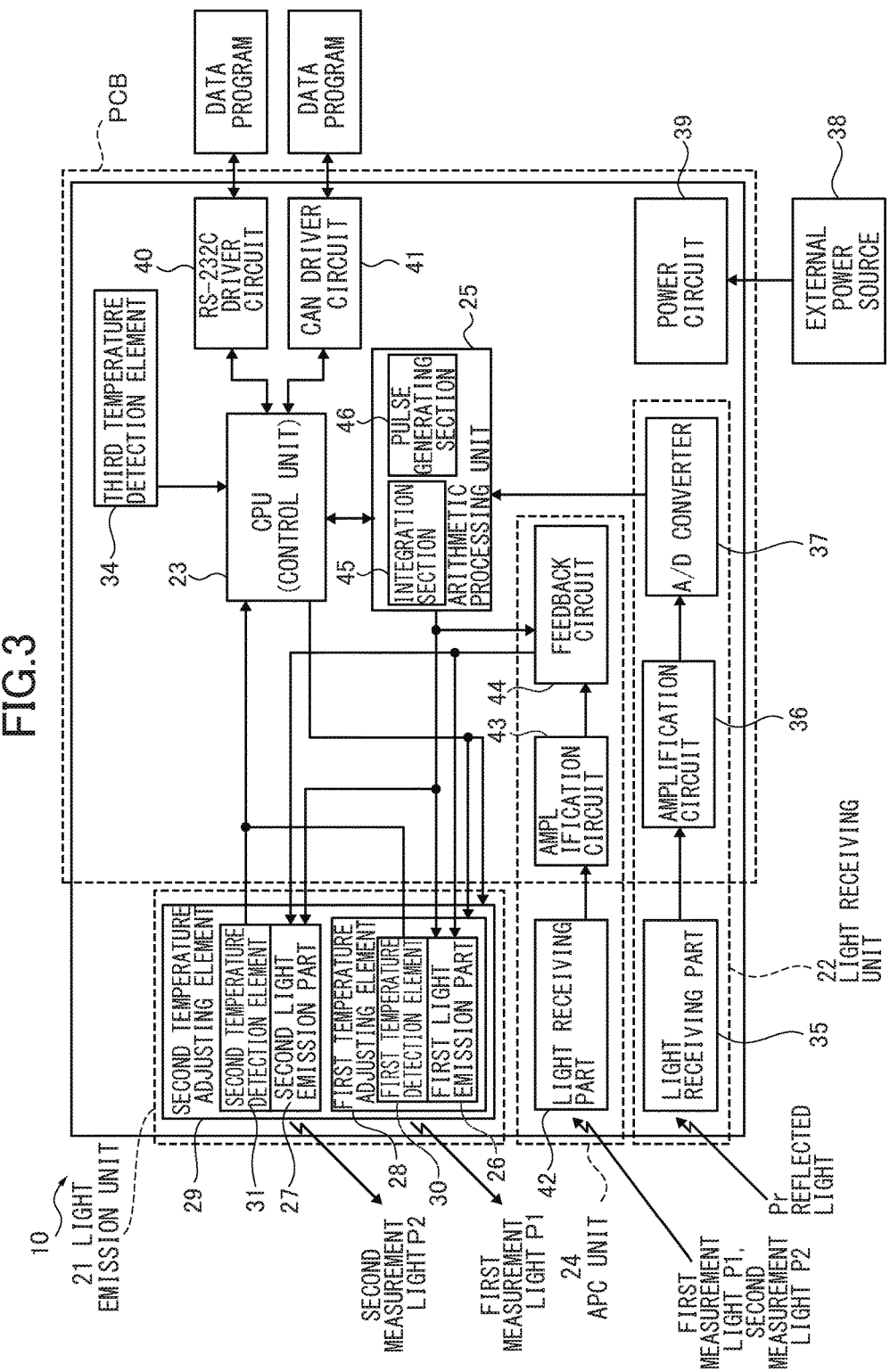
FIG. 3 is a block diagram schematically showing a functional configuration of the plant sensor device 10.

As shown in FIG. 3, the plant sensor device 10 includes a light emission unit 21, the light receiving unit 22, a CPU (control unit) 23, an APC unit, and the arithmetic processing unit 25. The light emission unit 21 includes a first light emission part 26, a second light emission part 27, a first temperature adjusting element 28, a second temperature adjusting element 29, a first temperature detection element 30, and a second temperature detecting unit 31.

The first light emission part 26 is a light emission member and is an example of a light emission part which emits the first measurement light P1 having a first wavelength. The first light emission part 26 of this embodiment includes a pulse-type laser diode (PLD) and the wavelength at the peak value of the emitted light is set to 735 nm. That is, the first light emission part 26 can emit the light in the red wavelength range. The second light emission part 27 is a light emission member and is an example of a light emission part which emits the second measurement light P2 having a second wavelength. The second light emission part 27 of this embodiment includes a pulse-type laser diode (PLD) and the wavelength at the peak value of the emitted light is set to 808 nm. That is, the second light emission part 27 can emit the light in the infrared wavelength range. As described later, the first light emission part 26 and the second light emission part 27 are controlled (to adjust the output and to turn on/off the light) by the output power controller (i.e., APC unit 24 and arithmetic processing unit 25). The first temperature adjusting element 28, the second temperature adjusting element 29, the first temperature detection element 30, and the second temperature detection element 31 are provided to adjust the temperatures of the first light emission part 26 and the second light emission part 27.

The first temperature adjusting element 28 and the second temperature adjusting element 29 cool the first light emission part 26 and the second light emission part 27. Specifically, the first temperature adjusting element 28 and the second temperature adjusting element 29 are made of Pertier elements. The first temperature adjusting element 28 has a size and a shape applicable to the first light emission part 26. The second temperature adjusting element 29 has a size and a shape that allow both of the second light emission part 27 and the first temperature adjusting section 28 to be installed thereon (see FIG. 4). The first temperature detection element 30 detects the temperature of the first light emission part 26, and the second temperature detection element 31 detects the temperature of the second light emission part 27. In this embodiment, the first temperature detection element 30 and the second temperature detection element 31 are made of thermistors.

Figure 4:
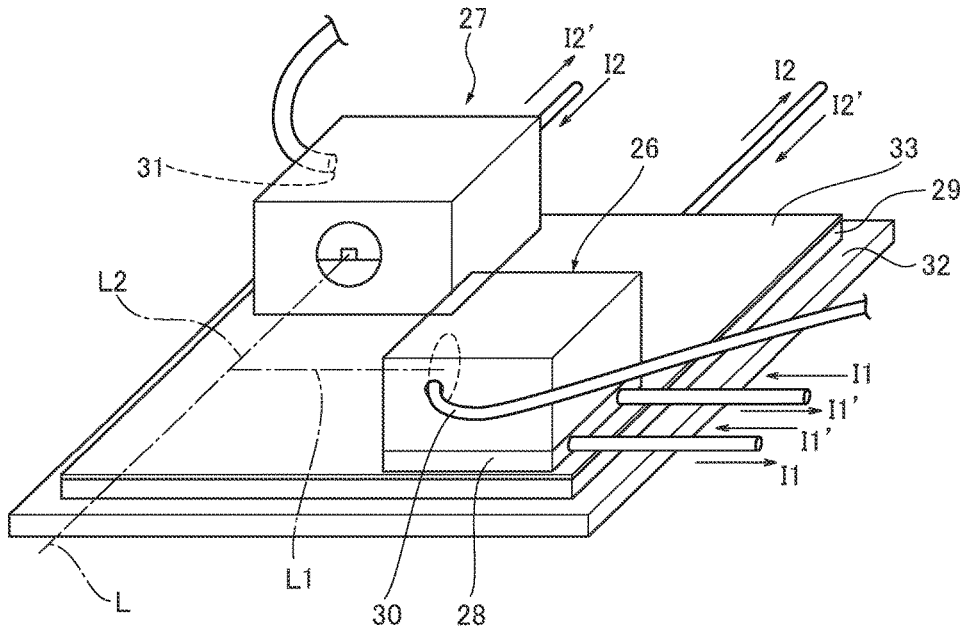
FIG. 4 is an explanatory view for explaining a configuration for temperature adjustment using a first temperature adjusting element 28 and a second temperature adjusting element 29.

As illustrated in FIG. 4, in the light emission unit 21 of the embodiment, the second temperature adjusting element 29 is attached to a base substrate 32, and a metal plate 33 being substantially as large as the second temperature adjusting element 29 is attached to the second temperature adjusting element 29. The second light emission part 27 is provided to one corner portion of the metal plate 33, and on the opposite corner portion thereto, the first light emission part 26 is provided through the first temperature adjusting element 28. That is, the second light emission part 27 is attached to the base substrate 32 through the metal plate 33 and the second temperature adjusting element 29. On the other hand, the first light emission part 26 is attached to the base substrate 32 through the first temperature adjusting element 28, the metal plate 33, and the second temperature adjusting element 29. The first temperature detection element 30 is attached to the first light emission part 26, and the second temperature detection element 31 is attached to the second light emission part 27. Here, the light emission unit 21 of this embodiment further includes a thermistor to detect temperature of a printed circuit board PCB having various circuits as a third temperature detection element 34, as illustrated in FIG. 3. The third temperature detection element 34 may be provided at a position close to the light receiving part (i.e., light receiving unit 22 (light receiving part 35) or APC unit 24 (light receiving part 42)) to detect the temperature of the printed circuit board PCB having the driving circuit of the light receiving part, and the detected temperature is used to manage a light receiving signal generated by the light receiving part.

In the light emission unit 21, the detection results of the first temperature detection element 30, the second temperature detection element 31, and the third temperature detection element 32 are outputted to the CPU 23. The CPU 23 then controls the first temperature adjusting element 28 to keep the temperature of the first emission element 26 constant based on the detection results of the first temperature detection element 30, and controls the second temperature adjusting element 29 to keep the temperature of the second emission element 27 constant based on the detection results of the second temperature detection element 31. Thus, the CPU 23 functions as a first temperature control circuit for controlling the temperature of the first light emission part 26 and also functions as a second temperature control circuit for controlling the temperature of the second light emission part 27. Here, the second temperature adjusting element 29 of this embodiment directly adjusts the temperature of the second light emission part 27 and further adjusts the temperature of the first light emission part 26 through the first temperature adjusting element 28.

The second temperature adjusting element 29 and the first temperature adjusting element 28 are made of Pertier elements. Therefore, by controlling the conduction directions by the CPU 23, the first temperature adjusting element 28 and the second temperature adjusting element 29 can adjust the temperatures. As illustrated in FIG. 4, when the current flows in a direction indicated by an arrow I2, the second temperature adjusting element 29 generates heat and heats up the second light emission part 27 through the metal plate 33. When the current flows in a direction indicated by an arrow I2', the second temperature adjusting element 29 absorbs heat and cools the second light emission part 27 through the metal plate 33. When the current flows in a direction indicated by an arrow I1, the first temperature adjusting element 28 generates heat and heats up the first light emission part 26. When the current flows in a direction indicated by an arrow I1', the first temperature adjusting element 28 absorbs heat and cools the first light emission part 26. It should be noted that, since the first temperature adjusting element 28 (the first light emission part 26) is placed on the second temperature adjusting element 29 through the metal plate 33, the first temperature adjusting element 28 is affected by heat absorption and heat generation of the second temperature adjusting element 29. Therefore, when the first temperature adjusting element 28 is controlled by the CPU 23, the temperature adjustment executed by the second temperature adjusting element 29 is also taken into consideration.

As illustrated in FIG. 3, the light receiving unit 22 includes the light receiving part 35 for the measurement, an amplification circuit 36, and an Analog/Digital (A/D) converter 37. The light receiving part 35 receives the reflected light Pr from the target plants (crops Cr) to which the first measurement light P1 and the second measurement light P2 have been irradiated, and outputs an electrical signal in accordance with the light volume of the received light. The light receiving part 35 of this embodiment is formed of six photodiodes PD (not illustrated) and outputs the electrical signal (i.e., detection result) to the amplification circuit 36. Note the electrical signals outputted from the light receiving part 35 contain not only the signals generated in accordance with the light volume of the reflected light Pr from the target plants (crops Cr) but also signals generated in accordance with a light volume of a disturbance light. The amplification circuit 36 amplifies the inputted electrical signals appropriately and then outputs the amplified signals to the A/D converter 37. The A/D converter 37 converts the inputted electrical signals to digital signals and outputs the digital signals to the arithmetic processing unit 25.

The Central Processing Unit (CPU) 23 of the plant sensor device 10 functions as a control unit. That is, the CPU 23 integrally controls each section, to which the electrical power is supplied from an external power source 38 through a power circuit 39, based on a program stored in a memory (not illustrated). The CPU 23 may communicate and exchange data with the outside through the driver circuit 40 and/or the driver circuit 41 to obtain data and/or program necessary to drive the plant sensor device 10. Here, the driver circuit 40 complies with the RS-232C standard, and the driver circuit 41 is adapted to realize CAN communication. Further, as described above, the CPU 23 can adjust the temperatures of the first light emission part 26 and the second light emission part 27 (in other words, the CPU 23 can control the first temperature adjusting element 28 and the second temperature adjusting element 29).

Based on integrated signals outputted from the arithmetic processing unit 25 (specifically, an integration section 45 thereof), the CPU 23 further calculates reflection rates of the target plants (crops Cr), to which the first measurement light P1 and the second measurement light P2 have been irradiated, with respect to the first measurement light P1 and the second measurement light P2 (the details will be described later). The CPU 23 also functions as an arithmetic section for calculating the normalized difference vegetation index (NDVI) of the target plants (crops Cr) based on the calculated results (i.e., calculated reflection rates), and as an arithmetic section for calculating the plant height H of the target plants (crops Cr) based on times required to reflect the first measurement light P1 and the second measurement light P2.

Figure 5:
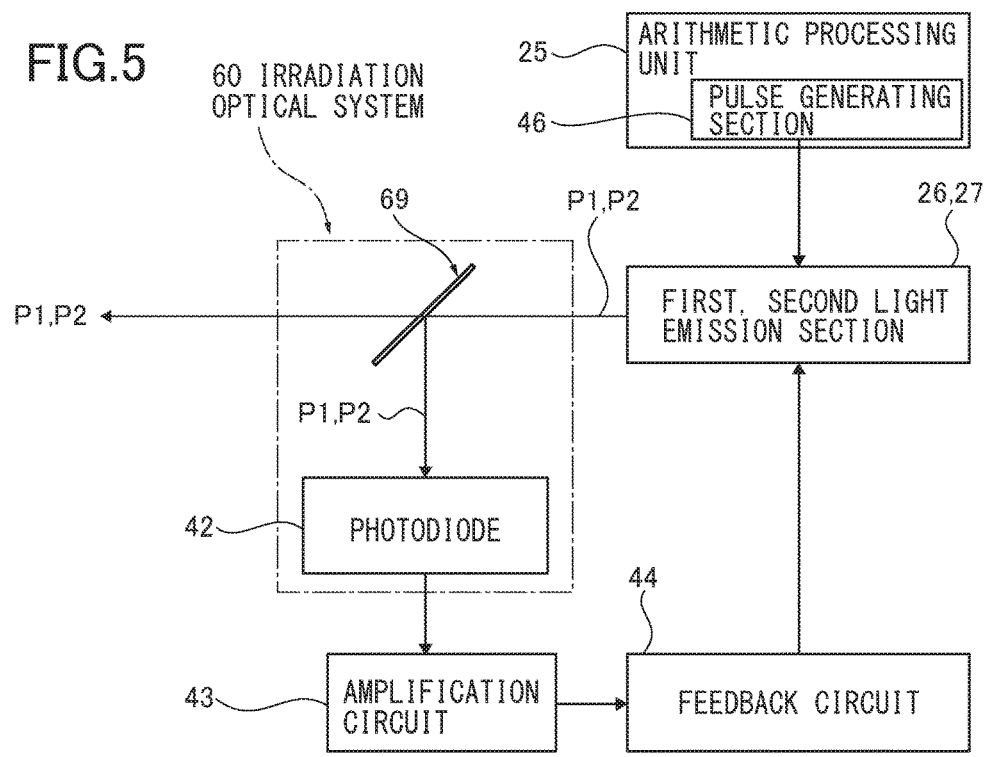
FIG. 5 is an explanatory view for showing a concept of an APC unit 24 in which a light emission volume of a first light emission part 26 is kept constant.

The APC unit 24 stabilizes the output powers of the first light emission part 26 and the second light emission part 27, specifically, the APC unit 24 stabilizes and maintains the intensities (light volumes) of the first measurement light P1 and the second measurement light P2 at predetermined intensities (feedback control). The APC unit 24 includes the light receiving part 42, an amplification circuit 43, and a feedback circuit 44. The light receiving part 42 (second light receiving part) is provided to an irradiation optical system 60 to receive a part of the first measurement light P1 and a part of the second measurement light P2 prior to the emission of the first measurement light P1 and the second measurement light P2 from the plant sensor device 10 (specifically, cylindrical lens 70), as illustrated in FIG. 5 and FIG. 6. The light receiving part 42 receives light on the light receiving surface and outputs an electrical signal in accordance with the light volume of the received light. In this embodiment, the light receiving part 42 is formed of photodiodes PD. As illustrated in FIG. 3 and FIG. 5, the light receiving part 42 outputs electrical signals (detection results) to the amplification circuit 43. The amplification circuit 43 amplifies and outputs the inputted electrical signals to a feedback circuit 44. Based on the inputted electrical signals, the feedback circuit 44 controls the driving circuits of the first light emission part 26 and the second light emission part 27 to keep the light receiving signals constant. With this, the first light emission part 26 and the second light emission part 27 are automatically controlled such that the intensities of the first measurement light P1 and the second measurement light P2 respectively emitted from the first light emission part 26 and the second light emission part 27 are kept constant. The detailed configuration thereof will be described later.

In the APC unit 24, the light receiving part 42 functions as an auxiliary light receiving element that receives a part of the first measurement light P1 and a part of the second measurement light P2 respectively irradiated from the first light emission part 26 and the second light emission part 27 to the target plants (crops Cr). Further, the amplification circuit 43 and the feedback circuit 44 of the APC unit 24 function as a light volume controller that controls the output powers of the first light emission part 26 and the second light emission part 27 based on the light receiving signals outputted from the auxiliary light receiving element such that the intensities of the first measurement light P1 and the second measurement light P2 are kept constant.

The arithmetic processing unit 25 is formed of a Field Programmable Gate Array (FPGA), and, as illustrated in FIG. 3, has an integrating function (integration section 45) and a emission light control function (pulse generating section 46). The integration section 45 integrates the light receiving signals at the light receiving part 35 for a predetermined time to generate and output an integrated signal. The pulse generating section 46 generates a pulse signal to control the first light emission part 26 and the second light emission part 27. The operation of the integration section 45 will be described later. The pulse generating section 46 generates pulse signals and outputs the generated pulse signals to the first light emission part 26 and the second light emission part 27 to control the first light emission part 26 and the second light emission part 27 such that the first light emission part 26 and the second light emission part 27 emit the lights at different timings from each other. That is, the arithmetic processing unit 25 (specifically, the pulse generating section 46 thereof) functions as an output power controller that cooperates with the APC unit 24 to drive the first light emission part 26 and the second light emission part 27 (specifically, to adjust the output power and to turn on/off the lights thereof). In this embodiment, the output power controller (specifically, the arithmetic processing unit 25 thereof) alternately emits the light from the first light emission part 26 and the second light emission part 27 with the same time periods, and sets an identical drive stop time (lit-off time) after each emission.

Accordingly, in the plant sensor device 10 of the disclosure, the CPU 23, the APC unit 24, and the arithmetic processing unit 25 drive and control the light emission part (first light emission part 26 and second light emission part 27) and the light receiving part 35. Further, the CPU 23, the APC unit 24, and the arithmetic processing unit 25 function as a controller to determine a spectroscopy vegetation index (normalized difference vegetation index) and plant height H of the target plants (crops Cr) from the measurement lights (i.e., first measurement light P1 and second measurement light P2) and the reflected light Pr.

As illustrated in FIG. 6, the plant sensor device 10 includes the irradiation optical system 60 to form the predetermined irradiation areas IA (see FIGS. 7A, 7B, and FIGS. 8A, 8B) by the first light emission part 26 and the second light emission part 27. In addition to the first light emission part 26 and the second light emission part 27, the irradiation optical system 60 includes a first lens 61, a second lens 62, a dichroic mirror 63, a third lens 64, an optical fiber 65, a wound member 66, the fourth lens 67, a fifth lens 68, a half mirror 69, the cylindrical lens 70, and the light receiving part 42.

The first lens 61 is provided correspondingly to the first light emission part 26 and collimates the first measurement light P1 emitted from the first light emission part 26 into a luminous flux parallel to a first emission optical axis L1. The second lens 62 is provided correspondingly to the second light emission part 27 and collimates the second measurement light P2 emitted from the second light emission part 27 into a luminous flux parallel to a second emission optical axis L2. In the irradiation optical system 60, an emission optical axis L is arranged coaxially to the second emission optical axis L2. The second emission optical axis L2 and the first emission optical axis L1 are arranged orthogonal to each other, and the dichroic mirror 63 is disposed at the intersection of those optical axes.

The dichroic mirror 63 allows the second measurement light P2 from the second light emission part 27 to transmit through the dichroic mirror 63, and leads the second measurement light P2 to the third lens 64 along with the emission optical axis L. Further, the dichroic mirror 63 reflects the first measurement light P1 emitted from the first light emission part 26 toward the third lens 64 along with the emission optical axis L. It should be noted that, in reality, the second emission optical axis L2 and the emission optical axis L are slightly different from each other due to the optical property of the dichroic mirror 63. Therefore, the positions of the second light emission part 27 with respect to the dichroic mirror 63 and the first light emission part 26 are determined such that the second measurement light P2 advances along the emission optical axis L (i.e., the second emission optical axis L2 coincides with the emission optical axis L) after transmitting through the dichroic mirror 63. The dichroic mirror 63 of this embodiment at least reflects the light in the wavelength range around 735 nm (i.e., red wavelength range (first wavelength)) and allows the light in the wavelength range around 808 nm (i.e., infrared wavelength range (second wavelength)) to transmit therethrough. Therefore, the dichroic mirror 63 functions as an optical path merger that merges the emission optical path of the first measurement light L1 from the first light emission part 26 and the emission optical path of the second measurement light L2 from the second light emission part 27, and guides the merged measurement lights to the third lens 64 along the emission optical axis L (i.e., through a common emission optical path). The third lens 64 condenses the reflected first measurement light P1, which has been reflected by the dichroic mirror 63, and the second measurement light P2, which has transmitted through the dichroic mirror 63, onto an incidence surface 65a provided at an end of the optical fiber 65. It should be noted that the positions of the first light emission part 26 and the second light emission part 27 may be switched.

The optical fiber 65 emits the first measurement light P1 and the second measurement light P2, which have entered through the incidence surface 65a, from an emission surface 65b provided on the other end of the optical fiber 65. The optical fiber 65 has a function to transmit the first measurement light P1 and the second measurement light P2 thereinside while mixing the first measurement light P1 and the second measurement light P2. In this embodiment, a mode scrambling processing is applied to the optical fiber 65 in order to promote the mixing effect. The mode scrambling processing is made to induce mutual exchange of optical power among modes in the light guide path of the optical fiber 65. In this embodiment, the optical fiber 65 is wound around the wound member 66 for the mode scrambling processing. The wound member 66 applies the mode scrambling processing by winding the optical fiber 65 within a range of allowable bending radius of the optical fiber 65. As a result, the first measurement light P1 and the second measurement light P2 outputted from the optical fiber 65 (i.e., light exit end 65b) have the intensity equal to each other when viewed in a plane orthogonal to the light traveling direction, and are made as unpolarized lights (randomly-polarized lights). Here, each of the first measurement light P1 and the second measurement light P2 emitted from the first light emission part 26 and the second light emission part 27 has an oval shape when viewed in the plane orthogonal to the light traveling direction. However, due to the mixing effect in the optical fiber 65, each of the first measurement light P1 and the second measurement light P2 emitted from the emission surface 65b is formed to have a circular shape. The optical fiber 65 emits the first measurement light P1 and the second measurement light P2, which have entered through the incidence surface 65a, from the emission surface 65b to the fourth lens 67 along the emission optical axis L.

The fourth lens 67 collimates the first measurement light P1 and the second measurement light P2 emitted from the emission surface 65b into a luminous flux parallel to the emission optical axis L. The half mirror 69 is provided behind the fourth lens 67 on the emission optical axis L. The half mirror 69 transmits a part of the inputted collimated luminous flux (i.e. first measurement light P1 and second measurement light P2) while reflects the other part of the inputted collimated luminous flux on a branched emission optical axis Lb on which the fifth lens 68 is disposed. The fifth lens 68 condenses the collimated luminous flux (i.e. first measurement light P1 and second measurement light P2), which has been reflected by the half mirror 69, onto an incidence surface 42a of the light receiving part 42 on the branched emission optical axis Lb. That is, the half mirror 69 functions as a luminous flux splitter that splits the part of the first measurement light P1 and the second measurement light P2 toward the light receiving part 42 that functions as the output power controller. With this, the APC unit 24 is capable of adjusting the output powers of the first light emission part 26 and the second light emission part 27 by using the first measurement light P1 and the second measurement light P2 that are unpolarized lights having a uniform intensity distribution after passing through the optical fiber 65 (the common outgoing light path).

The cylindrical lens 70 is provided behind the half mirror 69 on the emission optical axis L. As illustrated in FIG. 6 and FIGS. 7A, 7B, the cylindrical lens 70 is an optical member having a relatively strong refractive power only in one direction when viewed in a plane orthogonal to the emission optical axis L, and expands the first measurement light P1 and the second measurement light P2 in the one direction when viewed in the plane orthogonal to the emission optical axis L. As described above, each of the first measurement light P1 and the second measurement light P2 emitted from the emission surface 65b of the optical fiber 65 has a circular shape when viewed in the plane orthogonal to the emission optical axis L. The first measurement light P1 and the second measurement light P2 having the circular cross section shape are each expanded by the cylindrical lens 70 to a predetermined size only in the one direction, resulting in having an oval cross section shape (see FIGS. 7A, 7B, and FIGS. 8A, 8B, for example).

The cylindrical lens 70 is supported to be rotatable about the emission optical axis L (see FIGS. 7A, 7B) by a rotation driver 71 (see FIG. 6). The rotation driver 71 is fixed to a casing (not illustrated) in which the irradiation optical system 60 of the plant sensor device 10 is accommodated. The cylindrical lens 70 forms an emission surface from which the first measurement light P1 and the second measurement light P2 of the irradiation optical system 60 are emitted. As illustrated in FIGS. 7A, 7B, by rotating the cylindrical lens 70 about the emission optical axis L (on its own axis) by the rotation driver 71 (see FIG. 6), the irradiation optical system 60 can change the direction to expand the first measurement light P1 and the second measurement light P2 when viewed in the plane orthogonal to the emission optical axis L (the direction is the aforementioned one direction). Thus, it is possible to rotate the irradiation area IA formed by the first measurement light P1 and the second measurement light P2 about the emission optical axis L (rotated on its own axis).

In the irradiation optical system 60, the first light emission part 26 emits the first measurement light P1 and the second light emission part 27 emits the second measurement light P2 in response to light-on control executed by the pulse generating section 46 of the arithmetic processing unit 25. The first measurement light P1 emitted from the first light emission part 26 passes through the first lens 61, and is reflected by the dichroic mirror 63. The first measurement light P1 then travels to the third lens 64 along the emission optical axis L. The second measurement light P2 emitted from the second light emission part 27 passes through the second lens 62 and the dichroic mirror 63, and then travels to the third lens 64 along the emission optical axis L. Accordingly, in the irradiation optical system 60, the emission optical path of the first measurement light P1 and the emission optical path of the second measurement light P2 are merged by the dichroic mirror 63, and then extend to the third lens 64 along the emission optical axis L. The luminous flux (first measurement light P1 and second measurement light P2) passed through the third lens 64 is inputted to the optical fiber 65 through the incidence surface 65a, and emitted from the emission surface 65b through the light guide path. The luminous flux then travels to the fourth lens 67. The luminous flux (first measurement light P1 and second measurement light P2) passed through the fourth lens 67 on the emission optical axis L is partially reflected by the half mirror 69. The reflected luminous flux is then inputted to the light receiving part 42 through the fifth lens 68 on the branched emission optical axis Lb. On the other hand, the remaining luminous flux is expanded in the one direction by the cylindrical lens 70 to have the oval cross section shape, and then emitted from the cylindrical lens 70. In this way, the optical path extending to the cylindrical lens 70 through the third lens 64, the optical fiber 65, the fourth lens 67, and the half mirror 69 forms a common emission optical path that connects the dichroic mirror 63 (optical path merger) and the cylindrical lens 70 (light emitter defining emission surface).

With the above configuration, the irradiation optical system 60 is capable of emitting both the first measurement light P1 and the second measurement light P2 from the same cylindrical lens 70 on the same emission optical axis L. Further, the irradiation optical system 60 is capable of forming the same oval-shaped irradiation area IA by each of the first measurement light P1 and the second measurement light P2. In addition, the irradiation optical system 60 is capable of rotating the irradiation areas IA of the first measurement light P1 and the second measurement light P2 about the emission optical axis L (on their own axes) by rotating the cylindrical lens 70 using the rotation driver 71 (see FIG. 6), as illustrated in FIGS. 7A, 7B. As exemplarily illustrated in FIGS. 8A and 8B, the plant sensor devices 10 are capable of adjusting the positions to form the irradiation areas IA around the tractor TR regardless of how to install the plant sensor devices 10 to the tractor TR (see irradiation areas IA indicated by solid lines and two-dot chain lines). As a result, it is possible to increase the freedom of the installation of the plant sensor devices 10 to the tractor TR. Further, the plant sensor devices 10 are capable of adjusting the positions to form the irradiation areas IA (see irradiation areas IA indicated by solid lines and two-dot chain lines) around the tractor TR even after installing the plant sensor devices 10 to the tractor TR.

Next, in the output power controller that drives the first light emission part 26 and the second light emission part 27, an example of a configuration of the light volume controller will be described. Here, the light volume controller controls the output power of the first light emission part 26 and the second light emission part 27 to keep the intensities of the first measurement light P1 and the second measurement light P2 constant. The light volume controller uses a single light receiving part 42 and a light volume control circuit, which is provided for each of the first light emission part 26 and the second light emission part 27, to control the output powers of the first light emission part 26 and the second light emission part 27 respectively. However, since the configuration and the operation of each of the light volume control circuits is identical to each other, the following explanation will be made and focus on the light volume control circuit of the first light emission part 26 with the light receiving part 42 with reference to FIG. 9. That is, an explanation about the light volume control circuit of the second light emission part 27 will be omitted.

Figure 9:
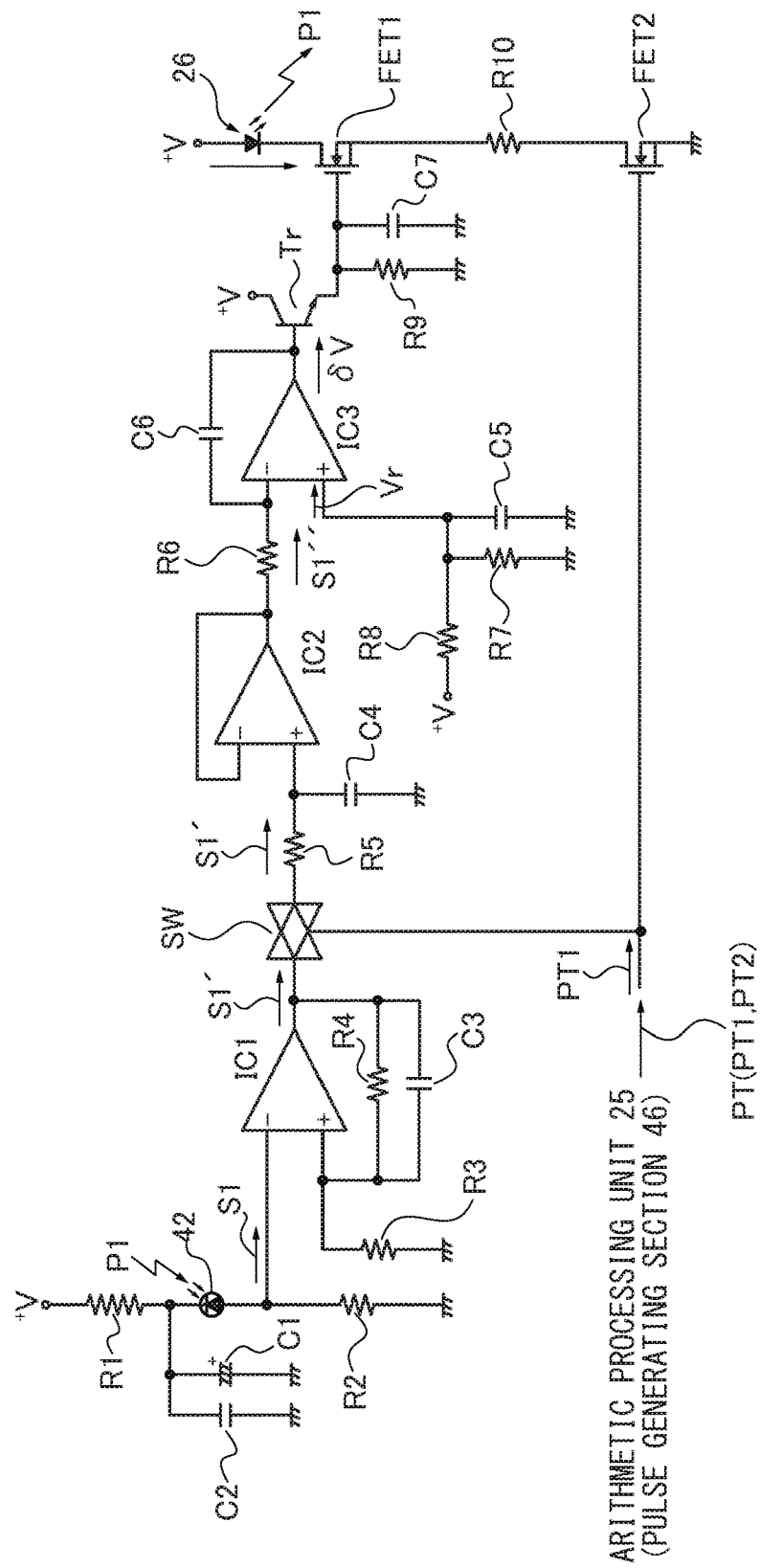
FIG. 9 is a circuit diagram that includes a first light volume control section (APC unit 24) to keep the light emission amount of the first light emission part 26 constant and a second light volume control section (pulse generating section 46) to control light emission timing of the first light emission part 26.

As described above, the light volume control circuit of the first light emission part 26 shown in FIG. 9 includes the light receiving part 42 capable of receiving a part of the first measurement light P1 and a part of the second measurement light P2. The light receiving part 42 has a cathode to which a voltage +V is applied through a resistor R1. The connection point of the cathode of the light receiving part 42 and the resistor R1 is grounded via a capacitor (electrolytic capacitor) C1. The capacitor C1 is connected to a capacitor C2 in parallel. An anode of the light receiving part 42 is grounded via a resistor R2.

A connection point of the anode of the light receiving part 42 and a resistor R2 is connected to a negative input terminal "−" of an operational amplifier IC1 (hereinafter also referred to as an op-amp IC1). A positive input terminal "+" of the op-amp IC1 is grounded via a resistor R3. An output terminal of the op-amp IC1 is connected to the positive input terminal "+" of the op-amp IC1 via a feedback resistor R4. The feedback resistor R4 is connected to a capacitor C3 in parallel. In collaboration with the resistors R1 to R4 and the capacitors C1 to C3, the op-amp IC1 performs current-voltage conversion of a pulsed light receiving signal S1 (i.e., an electrical signal in accordance with the received first measurement light P1 and the received second measurement light P2) outputted from the light receiving part 42, as well as outputs a pulsed light receiving signal S1' obtained by amplifying the pulsed light receiving signal S1.

The output terminal of the op-amp IC1 is connected to a positive input terminal "+" of an operational amplifier IC2 (hereinafter also referred to as an op-amp IC2) via an analog-switching element SW (hereinafter also referred to as a switch SW) and a resistor R5. A connection point of the positive input terminal "+" of the op-amp IC2 and the resistor R5 is grounded via a capacitor C4. An output terminal of the op-amp IC2 is connected to a negative input terminal "−" of the op-amp IC2 and is also connected to a negative input terminal "−" of an operational amplifier IC3 (hereinafter also referred to as an op-amp IC3) via a resistor R6. When a periodic pulse PT1 is inputted, the switch SW is turned on, and the output terminal of the op-amp IC1 is conducted to the positive input terminal "+" of the op-amp IC2 via the resistor R5. In other words, when the switch SW is turned on, the amplified pulse-type light receiving signal S1' is outputted from the output terminal of the op-amp IC1 to the positive input terminal "+" of the op-amp IC2. In collaboration with the resistor R5, the capacitor C4, and the resistor R6, the op-amp IC2 smooths the pulse-type light receiving signal S1' and outputs the smoothed signal S1' to the negative input terminal "−" of the op-amp IC3 as a continuous light receiving signal S1".

A positive input terminal "+" of the op-amp IC3 is grounded via a capacitor C5. The capacitor C5 is connected to a resistor R7 in parallel. A connection point of the positive input terminal of the op-amp IC3 and the capacitor C5 is applied with a positive voltage +V through a resistor R8. An output terminal of the op-amp IC3 is connected to a negative input terminal "−" of the op-amp IC3 via a capacitor C6 and is also connected to a base of a transistor Tr. A collector of the transistor Tr is applied with a positive voltage +V. An emitter of the transistor Tr is connected to a gate of a Field-Effect Transistor FET 1 (hereinafter also referred to as an FET1), and is also grounded via a resistor R9. The resistor R9 is connected to a capacitor C7 in parallel.

A drain of the FET1 is connected to a cathode of the first light emission part 26 that is a laser diode PLD. An anode of the first light emission part 26 is applied with a voltage +V. A source of the FET1 is connected to a drain of a field-effect transistor FET2 (hereinafter also referred to as an FET2) via a resistor R10. A source of FET2 is grounded.

The op-amp IC3 compares an output voltage (continuous light receiving signal S1") outputted from the output terminal of the op-amp IC2 and a reference voltage Vr determined by the capacitor C5, the resistor R7, and the resistor R8, and outputs a difference voltage δV between the output voltage from the op-amp IC3 and the reference voltage Vr to the base of the transistor Tr. The transistor Tr controls a gate voltage for the FET1 based on the inputted difference voltage δV such that the light emission volume of the first measurement light P1 emitted from the first light emission part 26 is kept constant. The op-amp IC3, the transistor Tr, the resistors R7 to R9, and the capacitors C5 to C7 mainly constitute the feedback circuit 44.

The pulse generating section 46 of the arithmetic processing unit 25 inputs periodic pulses PT to the switch SW and the gate of the FET2. The pulse generating section 46 generates the periodic pulses PT (see FIG. 10A) such that the first light emission part 26 and the second light emission part 27 alternately emit light for the same time width at predetermined time intervals. The FET2 is cyclically turned on and off as the gate of the FET2 receives the periodic pulses PT, and the switch SW is cyclically open and closed in response to the received periodic pulses PT. With this, the first light emission part 26 periodically receives a current in an arrow direction. Therefore, the first light emission part 26 periodically emits light (i.e., performs pulse-type light emission) and thus outputs the pulse-type first measurement light P1.

As illustrated in FIG. 10B, the periodic pulses PT outputted from the pulse generating section 46 of the arithmetic processing unit 25 includes pulses PT1 and pulses PT2. The pulses PT1 causes the first light emission part 26 to periodically emit the light, and the pulses PT2 causes the second light emission part 27 to periodically emit the light. The periodic pulses PT1 and the periodic pulses PT2 are alternately generated with the same pulse time widths, and thereby cause the first light emission part 26 and the second light emission part 27 to alternately emit the light for the same time widths. Further, a time interval between the generation of the periodic pulse PT1 and the generation of the periodic pulse PT2 is set equal to a time interval between the generation of the periodic pulse PT2 and the generation of the periodic pulse PT1. Therefore, both of the first light emission part 26 and the second light emission part 27 stop driving (i.e., are lit off) for the same time duration after each time the first light emission part 26 or the second light emission part 27 emits the light. To this end, the periodic pulse PT1 and the periodic pulse PT2 have the same cycle.

As described above, the integration section 45 of the arithmetic processing unit 25 integrates the light receiving signals from the light receiving unit 22 (specifically, the light receiving part 35 thereof) for a predetermined time period, and outputs the integrated signals. When assuming that the periodic pulse PT including the periodic pulse PT1 and the periodic pulse PT2 is generated as shown in FIG. 10A and the first measurement light P1 and the second measurement light P2 are emitted in accordance with the periodic pulse PT, the light receiving part 35 of the light receiving unit 22 (see FIG. 3) acquires or receives a light volume containing the reflected light component of the pulse-type first measurement light P1 and the disturbance light component generated by the disturbance light, and also acquires or receives a light volume containing the reflected light component of the pulse-type second measurement light P2 and the disturbance light component. As a result, the light receiving unit 22 periodically outputs a light receiving signal SN1 and a light receiving signal SN2. Here, the light receiving signal SN1 corresponds to the light volume containing the reflected light component of the first measurement light P1 and the disturbance light component. The light receiving signal SN2 corresponds to the light volume containing the reflected light component of the second measurement light P2 and the disturbance light component.

When the light receiving unit 22 receives the light receiving signal, the integration section 45 executes a first integration step to synchronize with the light-on control of the first light emission part 26 and the light emission part 27, and a second integration step to synchronize with the light-off control of the first light emission part 26 and the light emission part 27. Here, the light-on control and the light-off control are both executed by the pulse generating section 46. An example of the integration process executed by the integration section 45 (arithmetic processing unit 25) will be described hereinafter. For example, the integration section 45 divides the pulse width of the light receiving signal SN1 into segments t1 to t10 which are equal to each other, as shown in FIG. 10B. The integration section 45 then takes several samples from the light receiving outputs and sums up (or integrates) the sampled light receiving outputs for each segment (t1 to t10), and stores the sum values temporally. For example, the integration section 45 takes eight samples from the light receiving outputs and sums up the sample eight light receiving outputs in the segment t1 to obtain the sum value K1, as shown in FIG. 10C, and then stores the sum value K1 temporally. Similarly, the integration section 45 acquires sum values K2 to K10 for the other sections t2 to t10. The integration section 45 then selects the largest sum value among the sum values K1 to K10 and determines the selected sum value as the light receiving output value that represents a peak value (i.e., largest value) of the light receiving signal SN1. In the example shown in FIG. 10C, the sum value K6 is determined to be the light receiving output value (i.e., the peak value of the light receiving signal SN1 (see FIG. 10B)).

Figure 11:
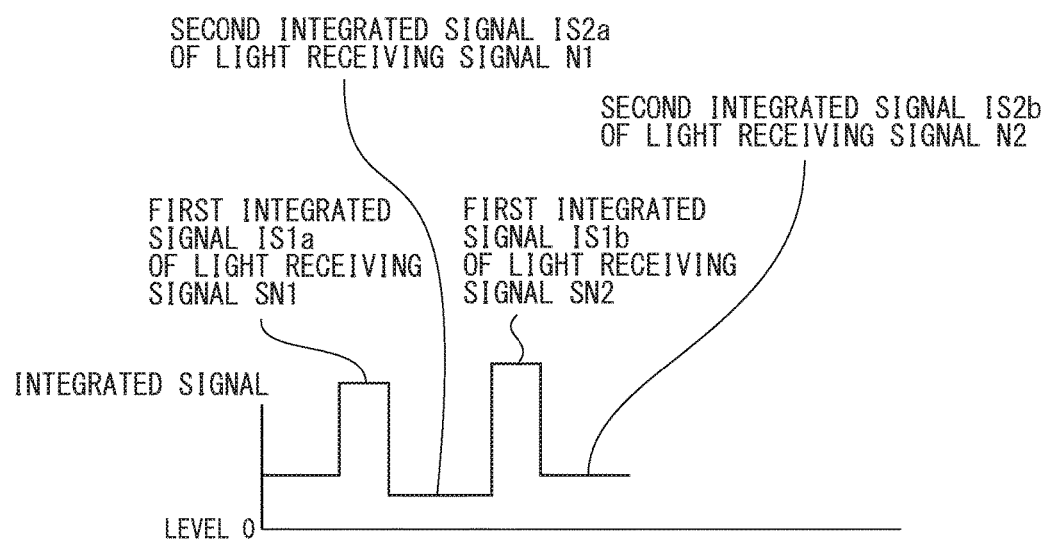
FIG. 11 is an explanatory view for explaining integrated signals outputted from an arithmetic processing unit 25 (integration section 45).
Figure 12:
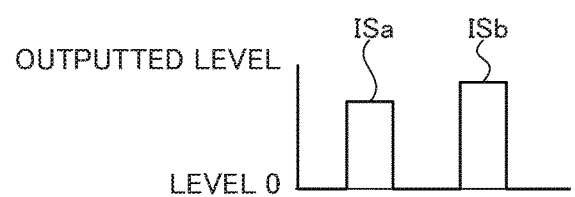
FIG. 12 is an explanatory view for explaining the integrated signals from which noise has been removed.

The integration section 45 (arithmetic processing unit 25) obtains the light receiving output value (peak value) for each of the several light receiving signals SN1 shown in FIG. 10A, and integrates a predetermined number of the light receiving output values (peak values) of the light receiving signals SN1 to acquire a first integrated signal IS1a (see FIG. 11). With the first integrated signal IS1a, the reflected light component generated by the first measurement light P1 is emphasized. The integration section 45 executes a similar calculation for the several light receiving signals SN2. That is, the integration section 45 obtains the light receiving output value (peak value) for each of the several light receiving signals SN2, and integrates a predetermined number of the light receiving output values (peak values) of the light receiving signals SN2 to acquire a first integrated signal IS1b (see FIG. 11). With the first integrated signal IS1b, the reflected light component generated by the second measurement light P2 is emphasized. Here, the process to obtain the first integrated signal IS1a and the first integrated signal IS1b represents the first integration step, and the integration section 45 outputs the integration results to the CPU 23.

The integration section 45 (arithmetic processing unit 25) executes a similar calculation for several pulse-type light receiving signals N1, from which the reflected light component of the first measurement light P1 is excluded, and for several pulse-type light receiving signals N2, from which the reflected light component of the second light P2 is excluded. With this, the integration section 45 obtains the light receiving output value (peak value) for each of the several light receiving signals N1, and integrates a predetermined number of the light receiving output values (peak values) of the light receiving signals N1 to acquire a second integrated signal IS2a (see FIG. 11). As the reflected light component of the first measurement light P1 has been excluded, the second integrated signal IS2a is the signal representing the disturbance light only. Similarly, the integration section 45 obtains the light receiving output value (peak value) for each of the retrieved several light receiving signals N2, and integrates a predetermined number of the light receiving output values (peak values) of the light receiving signals N2 to acquire a second integrated signal IS2b (see FIG. 11). As the reflected light component of the second measurement light P2 has been excluded, the second integrated signal IS2b is the signal representing the disturbance light only. The process to obtain the second integrated signal IS2a and the second integrated signal IS2b represents the second integration step, and the integration section 45 outputs the integration results to the CPU 23.

The CPU receives, from the arithmetic processing unit 25 (specifically, from the integration section 45 thereof), the first integrated signal IS1a, the first integrated signal IS1b, the second integrated signal IS2a, and the second integrated signal IS2b. The CPU 23 then subtracts the second integrated signal IS2a from the first integrated signal IS1a to obtain a first light receiving signal ISa (see FIG. 12). The first light receiving signal ISa represents the reflected light component of the first measurement light P1 from which the light volume component generated by the disturbance light has been excluded. Similarly, the CPU 23 subtracts the second integrated signal IS2b from the first integrated signal IS1b to obtain a second light receiving signal ISb (see FIG. 12). The second light receiving signal ISb represents the reflected light component of the second measurement light P2 from which the light volume component generated by the disturbance light has been excluded. The CPU 23 then calculates a reflection rate of the target plants (crops Cr), to which the first measurement light P1 and the second measurement light P2 are irradiated, with respect to the first measurement light P1 based on the total light volume of the first light emission part 26 and the first light receiving signal ISa. Similarly, the CPU 23 calculates a reflection rate with respect to the second measurement light P2 based on the total light volume of the second light emission part 27 and the second light receiving signal ISb, and then calculates the normalized difference vegetation index (NDVI) and the growth index (GI).

Accordingly, the CPU 23 can obtain the normalized difference vegetation index (NDVI) and the growth index (GI) of the target plants (crops Cr), to which the first measurement light P1 and the second measurement light P2 are irradiated, based on the reflection rate of the first measurement light P1, which has extremely low light volume component caused by the disturbance light, and the reflection rate of the second measurement light P2, which has extremely low light volume component caused by the disturbance light. As a result, it becomes possible to obtain the information regarding the growth status of the target plants (crops Cr). As described above, the information (i.e., the parameter to determine the growth status) regarding the growth status of the target plants (crops Cr) may be outputted to the outside through the driver circuit 40 and/or the driver circuit 41.

Next, some of characteristic features of the plant sensor device 10 according to the disclosure will be described with references to FIG. 13 to FIG. 15. The plant sensor device 10 (specifically, the CPU 23 thereof) determines a plant height H of the target plant (crop Cr) using the first measurement light P1 and the second measurement light P2 that are emitted from the first light emission part 26 and the second light emission part 27 to form the irradiation area IA. The plant height H is a height dimension (i.e., distance in the vertical direction) from the ground G to a top end of the target plants (crops Cr) and is one of the parameters to determine the growth status of the target plants (crops Cr). The concept for the determination of the plant height H will be described with FIG. 13, in which the plant sensor device 10 is provided to the tractor TR via the attachment part 11 as an example.

Figure 13:
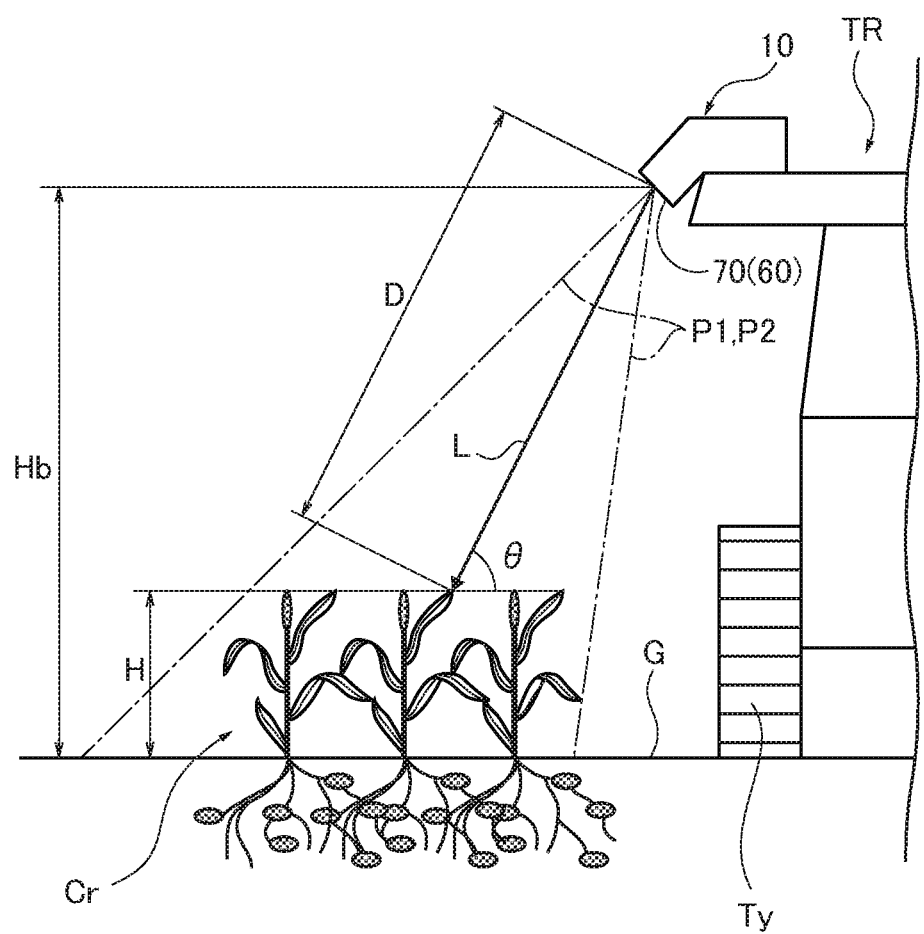
FIG. 13 is an explanatory view for explaining an example of a concept for determining a plant height H.

As illustrated in FIG. 13, the height position of the light emission part of the plant sensor device 10 installed to the tractor TR (i.e., a height dimension Hb from the ground G to the light emission position (the light emission surface (cylindrical lens 70) of the irradiation optical system 60) of the first measurement light P1 and the second measurement light P2) is determined. Additionally, an angle θ of the emission optical axis L of the installed plant sensor device 10 with respect to the horizontal surface is determined. It should be noted that the height dimension Hb and the angle θ may be appropriately adjusted depending on the installation of the plant sensor device 10. When the distance from the light emission part of the plant sensor device 10, to be specific, from the light emission position (i.e., the light emission surface (cylindrical lens 70) of the irradiation optical system 60) of the first measurement light P1 and the second measurement light P2 to the top end of the target plants (crops Cr) is D, the plant height H is calculated by the following equation (1).

$$H = Hb - D^* \sin \theta \quad (1)$$

That is, by obtaining the distance D, the plant sensor device 10 (specifically, the CPU 23 thereof) can calculate the plant height H. The CPU 23 (i.e., the plant sensor device 10) can calculate and obtain the distance D based on light-flying time (i.e., Time-of Flight (ToF) of a light signal). Namely, the CPU 23 of the embodiment measures the time (i.e., light-flying time) required for the light (first measurement light P1 and second measurement light P2) to be irradiated from the emission part, to be reflected by the target plants (crops Cr), and to return to the emission part, and then calculates the distance D based on the measured light-flying time and the speed of light. To this end, the CPU 23 of the embodiment obtains a time point (time) at which the first measurement light P1 is emitted, a time point (time) at which the reflected light Pr from the target plants (crops Cr) is received, and a time difference Δt between these time points (see FIG. 14).

Figure 14:
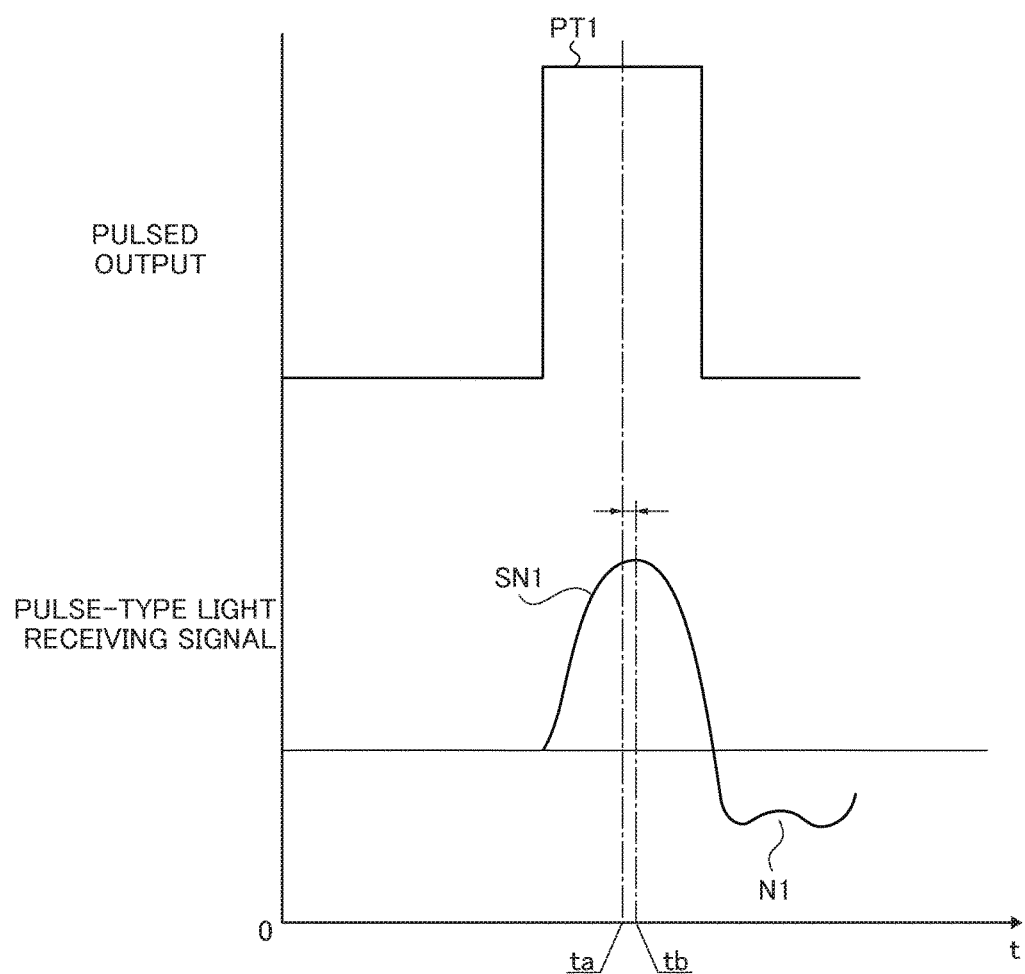
FIG. 14 is an explanatory view for explaining a time difference Δt.

Specifically, the CPU 23 determines and obtains, as the time point (time) at which the first measurement light P1 is emitted, a time point (time ta) indicating the center point of the periodic pulse PT generated by the pulse generating section 46 of the arithmetic processing unit 25, as shown in FIG. 14. As described above, this is because the first light emission part 26 emits the pulse-type first measurement light P1 in accordance with the periodic pulse PT from the pulse generating section 45. Further, the CPU 23 determines and obtains, as the time point (time) at which the reflected light Pr from the target plants (crops Cr) is received, a time point (time tb) indicating the center point of the sum value (e.g., the time period (t6) corresponding to the sum value K6 in the example of FIG. 10B) acquired as the peak value of the light receiving output value (i.e., light receiving signal SN1). By synchronizing the light receiving signal SN1 (to be precise, the time axis thereof) and the periodic pulse PT (to be precise, the time axis thereof), the time point (time) at which the reflected light Pr is received is appropriately used for calculating the time difference Δt. Here, a time point (time) indicating the center point of a time period is easily obtained by using a sampling clock for retrieving or sampling several light receiving outputs for each time-segment.

Accordingly, the CPU 23 subtracts the time point (time ta), at which the first measurement light P1 is emitted, from the time point (time tb), at which the reflected light Pr from the target plants (crops Cr) is received, and thus obtains the time difference Δt (Δt=tb−ta). The CPU 23 takes the time difference Δt as the light-flying time (first light-flying time) of the first measurement light P1 (i.e., reflected light Pr thereof), and calculates the distance to the irradiation area IA (i.e., the distance D to the top end of the target plants (crops Cr) in the irradiation area IA) based on the first light-flying time (i.e., time difference) Δt and the speed of light in accordance with the program stored in the memory (not illustrated). That is, the CPU 23 can calculate the plant height H by applying the distance D obtained in accordance with the program stored in the non-illustrated memory, the height dimension Hb, and the angle θ into the above equation (1). The calculation is also applicable with the second measurement light P2. As described above, the plant height H, which is the parameter to determine the growth status of the target plants (crops Cr), may be outputted to the outside through the driver circuit 40 and/or the driver circuit 41.

In a preferred example, the CPU 23 calculates a distance (D) with the first measurement light P1, also calculates the distance (D) with the second measurement light P2, and then determines the plant height H in the irradiation area IA by averaging the two of the calculated distances. As the plant sensor device 10 irradiates the first measurement light P1 and the second measurement light P2 to determine the normalized difference vegetation index, modifying the CPU 23 to obtain the distance (D) using the both measurement lights would not change the basic configuration and the control process of the plant sensor device 10. As is known, the propagation speed of the first measurement light P1 may differ from the propagation speed of the second measurement light P2 due to the difference of the wavelengths. Therefore, in the preferred example of this embodiment, the CPU 23 calculates the distance (D) by taking the propagation speed of each measurement light into account, and then determines the average value of the calculated distances (D) as the distance D. Specifically, in this embodiment, the CPU 23 calculates the distance (D) in accordance with the speed of light having the wavelength of 735 nm (first wavelength) and the time difference Δt obtained from this light, calculates the distance (D) in accordance with the speed of the light having the wavelength of 808 nm (second wavelength) and the time difference Δt obtained from this light, and then determines the average value of said two calculated distances (D) as the distance D.

As described above, the CPU 23 (plant sensor device 10) calculates the plant height H using the first measurement light P1 and the second measurement light P2 irradiated in the irradiation areas IA. That is, the obtained plant height H represents a central value of the plant heights of the target plants (crops Cr) in the irradiation areas IA. Here, the plant sensor device 10 is installed to each side of the tractor TR, as illustrated in FIG. 2, and irradiates the pulse-type first measurement light P1 and the pulse-type second measurement light P2 to form the irradiation areas IA on the both sides of the tractor TR when the tractor TR is traveling along an agricultural land of the crops Cr. Therefore, the plant sensor device 10 (specifically, the CPU 23 thereof) can continuously obtain the normalized difference vegetation indexes (NDVIs) and the plant heights H in the current irradiation areas IA as well as in the past irradiation areas (irradiation areas IA1 to IA12), which have been formed in the past, as illustrated in FIG. 15. Each of the plant sensor devices 10 spreads, from the fertilizer spreader Fs, the amount of the fertilizer adapted to the growth status of the target plants (crops Cr) in each irradiation area in accordance with the obtained normalized difference vegetation index (NDVI) and the plant height H in each of the irradiation areas (IA1 to IA12). Accordingly, the plant sensor device 10 of the embodiment works as a fertilization system for spreading the fertilizer adapted to the growth status of the target plants (crops Cr) together with the fertilizer spreader Fs.

As described above, the plant sensor device 10 of the embodiment determines the plant height H in addition to the spectroscopy vegetation index (in the above example, the normalized difference vegetation index (NDVI)) to indicate the growth status of the target plants (crops Cr). With this, the plant sensor device 10 is capable of determining the growth status of the target plants (crops Cr) in accordance with the spectroscopy vegetation index (normalized difference vegetation index) and the plant height H, thereby precisely evaluating the growth status of the target plants (crops Cr).

Additionally, the plant sensor device 10 measures the distance D from the light emission part, to be specific, from the emission position of the measurement lights (i.e., light emission surface (cylindrical lens 70) of irradiation optical system 60) to the target plants (i.e., the crops Cr (specifically, top end thereof)) by using the measurement lights (i.e., first measurement light P1 and second measurement light P2). With this, the plant sensor device 10 can obtain the plant height H using the first light emission part 26, the second light emission part 27, and the irradiation optical system 60 provided for determining the spectroscopy vegetation index (normalized difference vegetation index). That is, the plant sensor device 10 does not need to have an additional component for obtaining the plant height H as the parameter to determine the growth status. Therefore, it is possible to obtain the spectroscopy vegetation index (normalized difference vegetation index) and the plant height H of the target plants (crops Cr) without increasing the size, without complexing the configuration, and without increasing the manufacturing cost.

Further, the plant sensor device 10 may be installed to the tractor TR. With this, the plant sensor device 10 can continuously obtain the normalized difference vegetation index (NDVI) and the plant height H in each irradiation area while the tractor TR travels along the agricultural land (field) of the crops Cr. In the conventional technique, the plant height of the target plants (crops Cr) is measured using a tool such as a scale. Hence, it is hard to obtain the plant heights for the entire agricultural land (field) with the conventional technique. By obtaining the plant height H of the target plants (crops Cr) for the entire agricultural land (field), the plant sensor device 10 is capable of evaluating the growth status of the target plants (i.e., crops Cr) more accurately.

The plant sensor device 10 obtains the plant height H as a parameter to determine the growth status in addition to the spectroscopy vegetation index (normalized difference vegetation index). Therefore, it becomes possible to evaluate the growth status of the target plants (crops Cr) more accurately. The target plants (crops Cr) grow and have an expected plant height H if the amount of nutrition fed to the target plants (crops Cr) is appropriate. On the other hand, the target plants (crops Cr) have less plant height H if the amount of nutrition fed to the target plants (crops Cr) is less than the appropriate amount. Further, the target plants (crops Cr) have a higher plant height H if the amount of nutrition fed to the target plants (crops Cr) is larger than the appropriate amount. In other words, the correlation between the plant height H and the growth status is high.

The plant sensor device 10 determines the plant height H of the target plants (crops Cr) by using the distance D to the target plants (crops Cr), and the light emission part (light emission position of the measurement light (i.e., height position (height dimensions Hb) of light emission surface (cylindrical lens 70) of irradiation optical system 60)), as well as the irradiation direction of the light emission part (i.e., direction of emission optical axis L (angle θ)). Here, the height position (height dimension Hb) and the irradiation direction (direction of emission optical axis L (angle θ)) may be set when the plant sensor device 10 is installed. Thus, the plant sensor device 10 does not need to have an additional component for obtaining the plant height H as the parameter to determine the growth status, and therefore is able to easily obtain the plant height H of the target plants (crops Cr).

The plant sensor device 10 determines the distance D from the light emission part (light emission position of measurement light (i.e., light emission surface (cylindrical lens 70) of the irradiation optical system 60)) to the target plants (i.e., crops Cr (specifically, top end thereof)) based on the light-flying times of the measurement lights (first measurement light P1 and second measurement light P2) and the reflected light Pr from the target plants (crops Cr). The plant sensor device 10 then obtains the plant height H of the target plants (crops Cr) using the determined distance D. That is, the plant sensor device 10 can obtain the light-flying time and thereby the distance D only by adding the function to obtain the time point (time) at which the measurement light is emitted and the time point (time) at which the reflected light Pr from the target plants (crops Cr) is received as well as the function to calculate the time difference therebetween. It should be noted that these functions can be realized by simply modifying the program and/or the circuits of the control section (i.e., CPU 23, APC unit 24, and arithmetic processing unit 25). Therefore, the plant sensor device 10 can obtain the plant height H as the parameter to determine the growth status while minimizing the modification made to the plant sensor device for determining the spectroscopy vegetation index (normalized difference vegetation index) of the target plants (crops Cr).

The plant sensor device 10 calculates the time difference Δt between the time point (time ta) at which the measurement light (first measurement light P1 or second measurement light P2) is emitted and the time point (time tb) at which the reflected light Pr from the target plants (crops Cr) is received, and then calculates the light-flying time of the measurement light and the reflected light. Therefore, the plant sensor device 10 can easily obtain the light-flying time and thereby easily obtain the distance D and the plant height H. Specifically, the plant sensor device 10 of the embodiment synchronizes the light receiving signal outputted from the light receiving unit 22 with the lighting control of the measurement light (first measurement light P1 or second measurement light P2) when determining the spectroscopy vegetation index (normalized difference vegetation index) based on the measurement light and the reflected light Pr. Therefore, it is easy to obtain the light-flying time, the distance D, and the plant height H.

The plant sensor device 10 measures the plant height (H) with the first measurement light P1, measures the plant height (H) with the second measurement light P2, and then determines the average value of the measured heights (H) as the plant height H in the irradiation area IA. Accordingly, the plant sensor device 10 can obtain the normalized difference vegetation index as the spectroscopy vegetation index as well as the plant height H. Here, the plant sensor device 10, which is designed to obtain the normalized difference vegetation index, itself irradiates the first measurement light P1 and the second measurement light P2 to the irradiation area IA. Therefore, it is not necessary to modify or change the basic configuration or the control process of the plant sensor device to obtain the distance (D) using the measurement lights.

The plant sensor device 10 obtains, with the first measurement light P1, the distance (D) in accordance with the speed of light having the first wavelength (i.e., 735 nm) and the time difference Δt obtained from this light, and obtains, with the second measurement light P2, the distance (D) in accordance with the speed of light having the second wavelength (i.e., 808 nm) and the time difference Δt obtained from this light. The plant sensor device 10 then determines the average value of said two calculated distances (D) as the distance D. Accordingly, the plant sensor device 10 can determine the plant height H more accurately.

The plant sensor device 10 constitutes the fertilization system together with the fertilizer spreader Fs, and the fertilizer spreader Fs adjusts the spreading amount of the fertilizer based on the obtained spectroscopy vegetation index (normalized difference vegetation index) and the plant height H. Accordingly, the plant sensor device 10 can spread the appropriate amount of the fertilizer adapted to the growth status of the target plants in each of the irradiation areas IA (i.e., to target plants (crops Cr)). That is, the plant sensor device 10 can increase the spreading amount of the fertilizer in the area (irradiation area IA) having poor growth status of the target plants (crops Cr) so as to stimulate the growth of the target plants (crops Cr). Alternatively, the plant sensor device 10 can reduce the spreading amount of the fertilizer in the area (irradiation area IA) having too good growth status of the target plants (crops Cr) so as to suppress the growth of the target plants (crops Cr), thereby preventing the target plants (crops Cr) from collapsing due to its own weight. That is, by constituting the fertilization system with the plant sensor device 10 and the fertilizer spreader Fs, it becomes possible to easily and efficiently spread the fertilizer to the target plants (crops Cr). For example, if the plant sensor device 10 is installed to the tractor TR equipped with the fertilizer spreader Fs so as to constitute the fertilization system, the plant sensor device 10 can spread the appropriate amount of the fertilizer to the target plants (crops Cr) in accordance with the determined growth state of the target plants (crops Cr) while the tractor TR travels along the agricultural land (field) for the target plants (crops Cr). As a result, it is possible to efficiently cultivate the target plant (crop Cr).

Accordingly, in addition to the spectroscopy vegetation index (normalized difference vegetation index (NDVI)), the plant sensor device 10 of the disclosure is capable of measuring the plant height H as a parameter to determine the growth status of the target plants without adding a new component.

The plant sensor device 10 of the disclosure includes the light emission part that emits the measurement light to irradiate a target plant, the light receiving part that receives the measurement light reflected on the target plant (i.e., reflected light), and the control section that controls the light emission part and the light receiving part. The control section determines the spectroscopy vegetation index of the target plant by determining the reflection rate of the target plant in accordance with the measurement light and the reflected light. The control section further measures and calculates a distance from the light emission part to the target plants using the measurement light and the reflected light and then obtains a plant height of the target plants based on the distance. Accordingly, the plant sensor device of the disclosure can determine the parameter to determine the growth status different from the spectroscopy vegetation index without adding a component.

As the control section includes a configuration to obtain the plant height using the distance, the height position of the light emission part, and the irradiation direction of the light emission part, it is not necessary to include an additional configuration for obtaining the plant height as the parameter to determine the growth status of the target plant and is possible to obtain the plant height of the target plant easily.

The control section may measure the distance in accordance with the light-flying time of the measurement light and the reflected light. In such a case, the plant sensor device can obtain the plant height as the parameter to determine the growth status while minimizing the modification made to the plant sensor device for determining the spectroscopy vegetation index of the target plant.

The control section may obtain the light-flying time of the measurement light and the reflected light based on the time difference between the time point at which the measurement light is emitted and the time point at which the reflected light is received. In such a case, it is possible to easily obtain the light-flying time, and thereby obtain the distance and the plant height easily.

The light emission part includes a first light emission part and a second light emission part. The first light emission part emits, in order to irradiate the target plant, the first measurement light having the first wavelength. The second light emission part emits, in order to irradiate the target plant, the second measurement light having the second wavelength which is different from the first wavelength. The control section measures the light-flying time of the first measurement light and the reflected light based on the time difference between the time point at which the first measurement light is emitted and the time point at which the reflected light is received, and calculates the distance in accordance with the first light-flying time. The control section also measures the light-flying time (second light-flying time) of the second measurement light and the reflected light based on the time difference between the time point at which the second measurement light is emitted and the time point at which the reflected light is received, and calculates the distance in accordance with the second light-flying time. The control section then determines the plant height based on said two calculated distances. With this configuration, it becomes possible to obtain the plant height of the target plants accurately in addition to the normalized difference vegetation index (spectroscopy vegetation index).

That is, the control section calculates the distance based on the first light-flying time of the first measurement light and the reflected light, and the speed of light having the first wavelength, as well as calculates the distance based on the second light-flying time of the second measurement light and the reflected light, and the speed of light having the second wavelength. The control section then determines the plant height based on said two distances. With this configuration, it is possible to obtain the plant height accurately.

Additionally, the control section calculates the distance in accordance with the positional relationship between the light emission part and the light receiving part and the light receiving position on the light receiving part. With this configuration, the plant sensor device can obtain the plant height as the parameter to determine the growth status while minimizing the modification made to the plant sensor device for determining the spectroscopy vegetation index of the target plant.

The plant sensor device and a fertilizer spreader for spreading fertilizer may constitute a fertilization system.

The fertilizer spreader of the system adjusts the spreading amount of the fertilizer based on the spectroscopy vegetation index and the plant height obtained by the plant sensor device. With this configuration, it becomes possible to easily and efficiently spread the fertilizer to the target plant.

In the above embodiment, the plant sensor device 10 is described as an example of the plant sensor device according to the disclosure. However, the plant sensor device according to the disclosure should not be limited to the above embodiment. Any plant sensor device having the following elements is applicable: the plant sensor device including a light emission part that emits a measurement light to irradiate a target plant, a light receiving part that receives the measurement light reflected on the target plant (i.e., reflected light), and a control section that controls the light emission part and the light receiving part, wherein the control section determines a spectroscopy vegetation index of the target plant by determining a reflection rate of the target plant in accordance with the measurement light and the reflected light, wherein the control section is configured to measure a distance from the light emission part to the target plant based on the measurement light and the reflected light and then obtains a plant height of the target plant in accordance with the measured distance.

In the above embodiment, to determine a time difference $\Delta t$, the control section determines a time point (time ta) indicating a center point of a periodic pulse PT, which is generated by a pulse generating section 46 of an arithmetic processing unit 25, as a time point (time) at which the first measurement light P1 is emitted. However, the time point (time) at which the measurement light (first measurement light P1 or second measurement light P2) is emitted, may be determined using the light receiving signal outputted from the light receiving part 42. Alternatively, the time point may be determined using another configuration.

In the above embodiment, the control section determines a time point (time tb) indicating a center point of a segment, which corresponds to a sum value obtained as a peak value of the light receiving signal SN1, is selected as a time point (time) at which the reflected light Pr from the target plant (crop Cr) is received. However, the time point (time), at which the reflected light Pr from the target plant (crop Cr) is received, may be determined by selecting another point of the light receiving signal SN1. Alternatively, the time point may be determined using another configuration.

Figure 16:
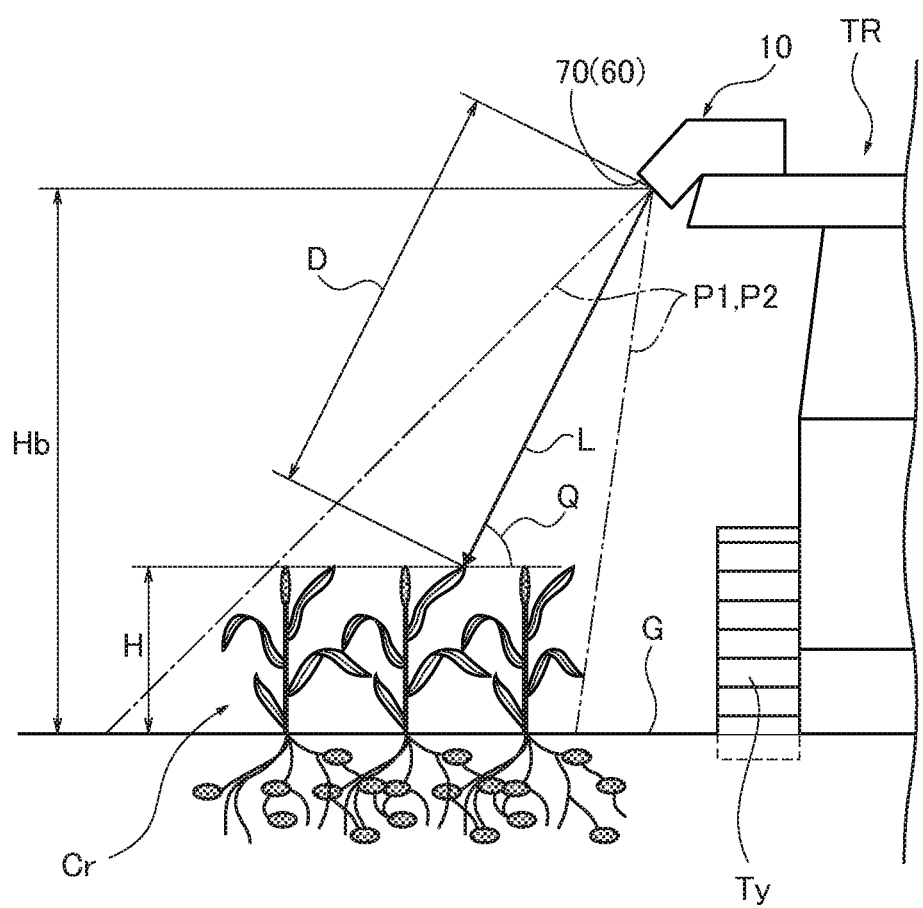
FIG. 16 is an explanatory view showing an example to measure a height Hb of a light emission position (i.e., light emission surface (cylindrical lens 70) of irradiation optical system 60) for a first measurement light P1 and a second measurement light P2 in case where the plant sensor device 10 is provided to the tractor TR.

In the above embodiment, the height dimension Hb is measured using the bottom surface (bottom) of a tire Ty as a reference, as illustrated in FIG. 13. However, as an agricultural machine (e.g., a tractor TR) is used in an agricultural land (ground G), the tire Ty may be partially buried in the ground G. In such a case, instead of the bottom surface of the tire Ty, the height dimension Hb may be measured using the ground G as the reference, as illustrated in FIG. 16.

In the above embodiment, the plant height H is measured using the ground G, which corresponds to the bottom surface (bottom) of the tire Ty, as the reference, and the plant height H represents a height dimension (i.e., length in vertical direction) from the ground G to the top end of the target plant (crop Cr). In other words, the plant sensor device 10 can measure the height dimension (i.e., length in vertical direction) from the referenced position (ground G) to the top end of a target. Accordingly, the plant sensor device 10 may be configured to determine the plant height H as follows. First, the plant sensor device 10 carries out the above-described measurement onto the soil where the target plant (crop Cr) has not grown to determine the height position of the soil surface from the reference position (ground G). Next, the plant sensor device 10 carries out the similar measurement after the target plant (crop Cr) has grown so as to determine the height position (measured height position) of the target plant (crop Cr) from the referenced height position (ground G). The plant sensor device 10 then subtracts the height position of the soil surface from the measured height position to determine the plant height H. With this configuration, the plant sensor device 10 can determine the plant height H of the target plant (crop Cr) using the height position of the actual soil surface as the reference. As a result, it becomes possible to determine the plant height more precisely and more accurately.

In the above embodiment, the distance D is determined based on based on light-flying time. However, the distance D may be determined through another calculation method with the measurement light (first measurement light P1 or second measurement light P2) and the reflected light Pr. For example, the distance D may be determined based on the triangulation method. FIG. 17 shows an example using the triangulation method. In this example, a length between a position of the light emission part (first light emission part 26 and second light emission part 27) that emits a measurement light (first measurement light P1 or second measurement light P2) and a position (in example of FIG. 17, emission optical axis L passing through the light emission surface (cylindrical lens 70) of irradiation optical system 60) of the light receiving part (light receiving unit 22 (i.e., light receiving part 35 thereof)) is defined as a distance d. Further, a length between a condenser lens 35L and a light receiving surface 35a of the light receiving part 35 is defined as a distance y. Additionally, a length from the light receiving position on the light receiving surface 35a of the light receiving part 35 to a position on the light receiving part 35 (specifically, a position at which the optical axis of the condenser lens 35L intersects the light receiving surface 35a) is defined as a distance x. In this case, the distance D is calculated by $(D=(d*y)/x)$. Here, the distance d and the distance y are set in accordance with the configuration of the light receiving part. Therefore, when the light receiving part 35 is capable of detecting the light receiving position on the light receiving surface 35a, the distance D is determined by obtaining the distance x based on the light receiving signal outputted from the light receiving part 35. This configuration also allows achieving the similar technical advantages to the above-described plant sensor device 10.

In the above embodiment, the first measurement light P1 (emitted from the first light emission part 26) is the light (luminous flux) having the wavelength of 735 nm at the peak value. However, the first measurement light P1 should not be limited thereto. Any light (luminous flux) in the red wavelength range is applicable as the first measurement light P1.

In the above embodiment, the second measurement light P2 (emitted from the second light emission part 27) is the light (luminous flux) having the wavelength of 808 nm at the peak value. However, the second measurement light P2 should not be limited thereto. Any light (luminous flux) in the infrared wavelength range is applicable as the second measurement light P2.

In the above embodiment, the crops Cr (agricultural product) are exemplarily used as the target plants. However, the target plants should not be limited thereto. Any plants such as cultivated plants and/or autogenous plants may be used as the target plants as long as the growth status is obtainable in accordance with the reflection rate with respect to the measurement light.

In the above embodiment, the plant sensor device 10 determines the normalized difference vegetation index (NDVI). However, it should not be limited thereto. Any spectroscopy vegetation index that can show the growth status of the target plant through determining the reflection rate of the target plant (crop Cr) based on the measurement light and the reflected light is applicable. For example, the plant sensor device 10 may determine a spectroscopy vegetation index that represents a protein content or a water content. In such a case, the number of the light emission parts and/or the wavelength of the measurement light may be selected and determined depending on the spectroscopy vegetation index to be determined.

In the above embodiment, the reflection rate with respect to the first measurement light P1 is calculated based on the entire light volume of the first light emission part 26. However, it should not be limited thereto. For example, the reflection rate with respect to the first measurement light P1 may be calculated based on the light receiving signal outputted from the light receiving part 42 and the first light receiving signal ISa.

In the above embodiment, the reflection rate with respect to the second measurement light P2 is calculated based on the entire light volume of the second light emission part 27. However, it should not be limited thereto. For example, the reflection rate with respect to the second measurement light P2 may be calculated based on the light receiving signal outputted from the light receiving part 42 and the second light receiving signal ISb.

In the above embodiment, the plant sensor devices 10 are installed to the tractor TR having the fertilizer spreader Fs. However, the fertilization system should not be limited thereto. Any system that is capable of communicating with the fertilizer spreader Fs and with the plant sensor devices 20 such that the fertilizer spreader Fs can adjust the spreading amount of the fertilizer based on the spectroscopy vegetation index (normalized difference vegetation index) and the plant height H obtained as the parameters to determine the growth status is applicable as the fertilization system.

Although the plant sensor device according to the disclosure has been described in terms of an exemplary embodiment, it should not be limited thereto. It should be appreciated that variations or modifications may be made in the embodiment by persons skilled in the art without departing from the scope of the disclosure as defined by the following claims.

The invention claimed is:

1. A plant sensor device comprising:
a light emission part for emitting a measurement light to irradiate a target plant;
a light receiving part for receiving the measurement light reflected on the target plant as a reflected light; and
a control section for controlling the light emission part and the light receiving part, wherein
the control section is configured to determine a spectroscopy vegetation index of the target plant by determining a reflection rate of the target plant in accordance with the measurement light and the reflected light, and
the control section is configured to calculate a distance from the light emission part to the target plant based on the measurement light and the reflected light, and to determine a plant height of the target plant in accordance with the distance.

2. The plant sensor device according to claim 1, wherein the control section is configured to determine the plant height in accordance with the distance, a height position of the light emission part, and an irradiation direction of the light emission part.

3. The plant sensor device according to claim 1, wherein the control section is configured to calculate the distance in accordance with a light-flying time of the measurement light and the reflected light.

4. The plant sensor device according to claim 3, wherein the control section is configured to determine the light-flying time of the measurement light and the reflected light based on a time difference between a time point at which the measurement light is emitted and a time point at which the reflected light is received.

5. The plant sensor device according to claim 1, wherein
the light emission part comprises a first light emission part for emitting a first measurement light having a first wavelength to irradiate the target plant and a second light emission part for emitting a second measurement light having a second wavelength different from the first wavelength to irradiate the target plant,
the control section is configured to control emission from the first light emission part and emission from the second light emission part at different timings from each other,
the control section is configured to determine a light-flying time of the first measurement light and the reflected light based on a time difference between a time point at which the first measurement light is emitted and a time point at which the reflected light is received, and to calculate the distance in accordance with the light-flying time; while the control section is configured to determine a light-flying time of the second measurement light and the reflected light based on a time difference between a time point at which the second measurement light is emitted and a time point at which the reflected light is received, and to calculate the distance in accordance with the light-flying time, and
the control section is configured to determine the plant height based on said calculated distances.

6. The plant sensor device according to claim 5, wherein
the control section is configured to calculate the distance in accordance with the light-flying time of the first measurement light and the reflected light, and speed of the light having the first wavelength,
the control section is configured to calculate the distance in accordance with the light-flying time of the second measurement light and the reflected light together, and speed of the light having the second wavelength, and
the control section is configured to determine the plant height based on said calculated distances.

7. The plant sensor device according to claim 1, wherein the control section is configured to calculate the distance in accordance with a positional relationship between the light emission part and the light receiving part, and a light receiving position on the light receiving part.

8. A fertilization system comprising:
a plant sensor device according to claim 1, and
a fertilizer spreader for spreading fertilizer,
wherein the fertilizer spreader adjusts a spreading amount of the fertilizer based on a spectroscopy vegetation index and a plant height acquired by the plant sensor device.

* * * * *